(12) United States Patent
Naeymi-Rad et al.

(10) Patent No.: US 8,554,742 B2
(45) Date of Patent: Oct. 8, 2013

(54) SYSTEM AND PROCESS FOR RECORD DUPLICATION ANALYSIS

(75) Inventors: Frank Naeymi-Rad, Libertyville, IL (US); Regis Charlot, Lake Bluff, IL (US); David Haines, Arlington Heights, IL (US); Matthew C Cardwell, Geneva, IL (US); Michael Decaro, St. Charles, IL (US)

(73) Assignee: Intelligent Medical Objects, Inc., Northbrook, IL (US)

( * ) Notice: Subject to any disclaimer, the term of this patent is extended or adjusted under 35 U.S.C. 154(b) by 726 days.

(21) Appl. No.: 12/498,186

(22) Filed: Jul. 6, 2009

(65) Prior Publication Data

US 2011/0004626 A1    Jan. 6, 2011

(51) Int. Cl.
G06F 7/00    (2006.01)

(52) U.S. Cl.
USPC ........................................................ 707/692

(58) Field of Classification Search
USPC ........................................................ 707/692
See application file for complete search history.

(56) References Cited

U.S. PATENT DOCUMENTS

| | | | |
|---|---|---|---|
| 5,903,889 A | 5/1999 | de la Huerga | |
| 6,246,794 B1 | 6/2001 | Kagehiro et al. | |
| 6,901,398 B1 | 5/2005 | Horvitz et al. | |
| 6,904,432 B2 | 6/2005 | Charlot et al. | |
| 6,987,221 B2 | 1/2006 | Platt | |
| 7,167,858 B2 | 1/2007 | Naeymi-Rad et al. | |
| 7,536,387 B2 | 5/2009 | Charlot et al. | |
| 7,562,067 B2 * | 7/2009 | Chaudhuri et al. | 1/1 |
| 2001/0051880 A1 | 12/2001 | Schurenberg | |
| 2002/0007284 A1 | 1/2002 | Schurenberg | |
| 2003/0088438 A1 | 5/2003 | Maughan et al. | |
| 2005/0216503 A1 | 9/2005 | Charlot et al. | |
| 2006/0179050 A1 * | 8/2006 | Giang et al. | 707/5 |

OTHER PUBLICATIONS

William Winkler, "Methods for Record Linkage and Bayesian Networks", Proc. Section Survey Research Methods, 2002.*
Fellegi et al., "A Theory for Record Linkage,", Dec. 1969, J. Am. Statistical Assoc., vol. 64, No. 328, pp. 1183-1210.*
Elmagarmid et al., "Duplicate Record Detection: A Survey", Jan. 2007, IEEE Transactions on Knowledge and Data Engineering, vol. 19, No. 1, pp. 1-16.*
Frank Fariborz Naeymi-Rad, "A Featured Dictionary to Support Database Translation, Information Retrieval, Intelligent Medical Records, and Expert Systems", May 1990, Chicago, IL.

(Continued)

Primary Examiner — Rehana Perveen
Assistant Examiner — Hung Havan
(74) Attorney, Agent, or Firm — Beem Patent Law Firm

(57) ABSTRACT

A system and process for record duplication analysis that relies on a multi-membership Bayesian analysis to determine the probability that records within a data set are matches. The Bayesian calculation may rely on objective data describing the data set as well as subjective assessments of the data set. In addition, a system and process for record duplication analysis may rely on the predetermination of probabilistic patterns, where the system only searches for patterns exceeding a chosen threshold. Work flow may include selecting which fields within each record should be analyzed, normalizing the values within those fields and removing default data, calculating possible patterns and their match probabilities, analyzing record pairs to determine which have patterns exceeding a chosen threshold to determine the presence of duplicates, and merging duplicates, closing transactions reflecting non-duplicates, identifying records having insufficient data to determine the existence or lack of a match, and/or rolling back accidental merges.

22 Claims, 18 Drawing Sheets

(56) References Cited

OTHER PUBLICATIONS

Gill, Leicester E., Ox-Link: The Oxford Medical Record Linkage System, 1997, Oxford University Press, Chapter 2.
Naeymi-Rad, F., Carmony, L, Trace, D., Georgakis, C., Weil, M.H., and Evens, M., 1988, A Relational Database Design in Support of Standard Medical Terminology in Multi-Domain Knowledge Bases. In Proceedings of the 1988 ACM SIGMOD International Conference on Management of Data (Chicago, Illinois, United States, Jun. 1-3, 1988). H. Boral and P. Larson, Eds.
Seligman, L. and Rosenthal, A., XMLs Impact on Databases and Data Sharing. Computer, Jun. 2001, pp. 59-67.

* cited by examiner

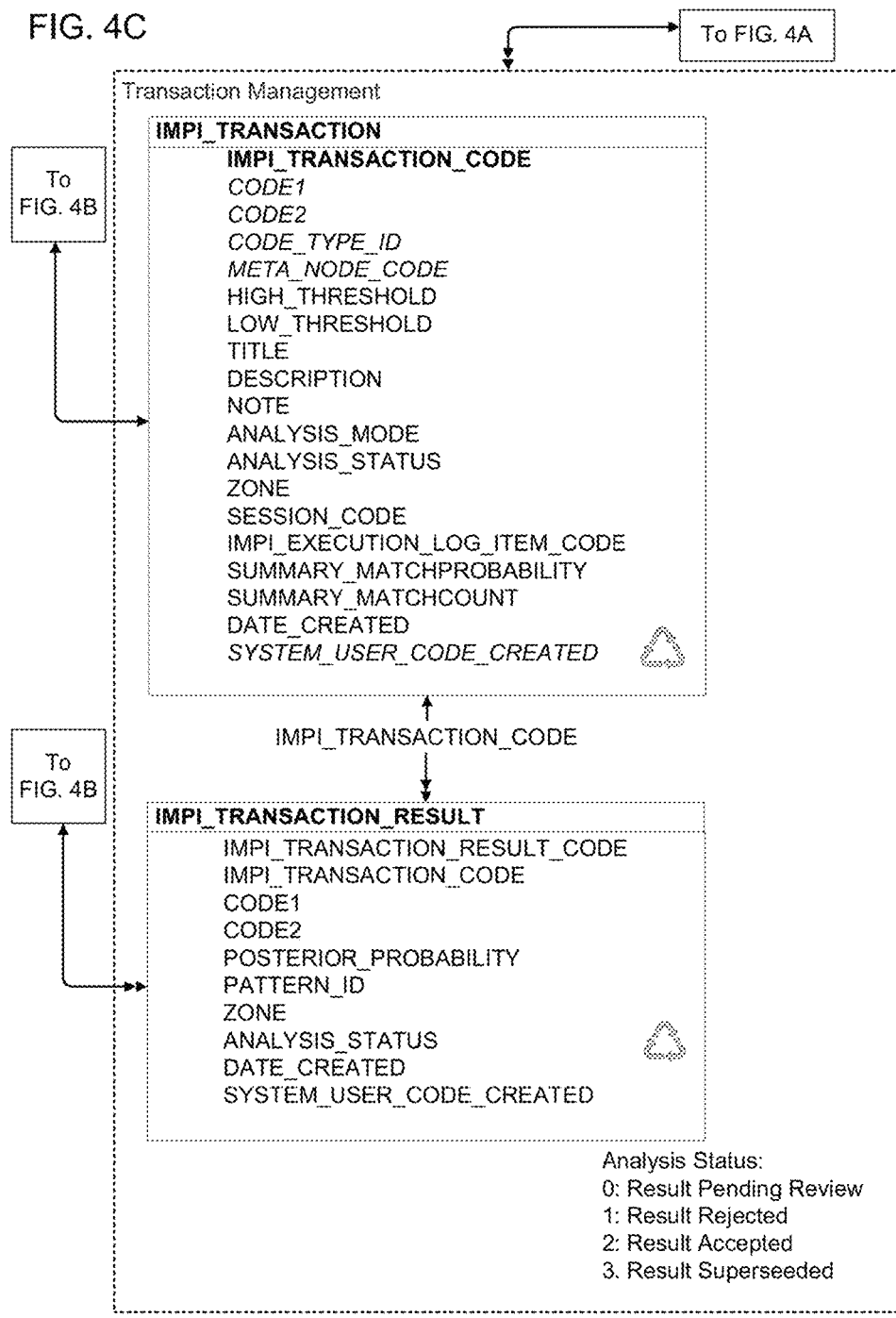

SYSTEM AND PROCESS FOR RECORD DUPLICATION ANALYSIS

BACKGROUND OF THE INVENTION

1. Field of the Invention

The present invention is directed to a system and process for analyzing records to determine duplicates.

2. Description of the Related Art

The concept of a master patient index (MPI) is well known in the healthcare industry. As healthcare computer systems become increasingly complex and distributed over wide areas, it is important to be able to uniquely and correctly identify individual patients over a wide array of disjoint or unconnected systems. An MPI system seeks to uniquely identify an individual based on information provided.

At its core, an MPI system stores information on a patient over time. As information changes for the patient, updates are made to the MPI system in order to identify the patient with greater granularity and accuracy. When a query is made, even with outdated information, an effective MPI system is able to return potential matches for that query with a high rate of accuracy. Even in cases where no reasonable match is available, an MPI system may return that result to the inquirer with the option of adding it to its database as a newly identified patient. In cases where possible matches exist, but with less than stellar probabilities of a match, MPI systems can interface with human or other artificially intelligent systems to make final decisions.

An MPI, therefore, may be applicable to a variety of systems. Consider cases where insurance companies or health care providers share information with other companies or providers on a regular, ongoing basis. Over time, patient information may evolve, as addresses change, erroneous data is corrected, or missing data is obtained. Where unique patient identifiers are not available due to organizational, privacy, or legal reasons, an MPI can provide a valuable link in cleaning or otherwise aggregating knowledge of the data.

Often, the information processed by an MPI centers on demographic data. This data may be sparse or outdated, which can lead to the discontinuity or loss of important patient data. To minimize this, an MPI system may take the provided information and perform comparisons with persons already known to the system. The processes employed may make probabilistic determinations based on the relevance of certain data points, or attributes. However, these probabilistic determinations often are based primarily on subjective assessments of the data. As such, previous MPIs may have required a user to have substantial knowledge of the data and, even then, may have required the user make several guesses in assessing the relative value of that information.

In addition, data sets on which an MPI operates often are exceedingly large, e.g., with millions, if not tens of millions, of records, each having dozens of different fields. Analysis of these data sets may be very time intensive and further may inhibit "real time" evaluations. In addition, the scale and scope of these data sets, and the need to compare each record with each other record and, therefore, fields within each of those records, means this task is beyond the scope of human calculation and analysis. At the same time, however, it may be desirable for the MPI to perform several tasks for which human reasoning and analysis may be beneficial. Context may be significant in determining whether a match exists or not. For example, two records may have different field values for the first name and matching values for other fields. In one instance, these two records may represent the same individual, where one of the first name field values is a nickname. In another instance, these two records may represent twins, who share the same last name, address and date of birth.

What is needed is a system or process that overcomes the drawbacks described above.

BRIEF SUMMARY OF THE INVENTION

In one aspect of the invention, a process operable on one or more computers for estimating a posterior probability of a match between a plurality of records in a database, each record having a plurality of fields, may comprise: calculating objective values relating to the fields; approximating subjective values relating to the fields; estimating an average number of duplicate records; estimating a total number of distinct duplicate records using the subjective values; determining a probability of a match between the records using the estimates; determining a probability of no match between the records; determining a conditional probability of a match between at least one of the fields, given a match between the records, using the subjective values; determining a conditional probability of a match between at least one of the fields, given no match between the records, using both the objective and subjective values; and using a Bayesian probability function to determine the posterior probability based on the probabilities and the conditional probabilities. The objective values may include: a percentage of defined values; a number of defined values; a number of defined values having frequencies greater than 2; and an average frequency. The subjective values may include: a prevalence of duplicates among the records; an error factor for the fields; a confidence factor for the fields; a permanence of the fields; and an estimated sample proportion for a confidence level, e.g., about 99%. Although a data set of records may have multiple fields within each record, the system may include selecting fewer than all of the fields for comparison. In one embodiment, the records may be medical records.

In another aspect of the invention, a process operable on one or more computers for identifying duplicate records among a plurality of records in a database, each record having a plurality of fields, may comprise: setting a threshold match probability; calculating possible patterns, wherein each pattern is a different permutation of comparisons between the fields; calculating match probabilities for each of the possible patterns; identifying patterns having match probabilities higher than the threshold match probability; and analyzing records corresponding to the identified patterns to determine whether the records are duplicates. The threshold match probability and the match probabilities may be Bayesian posterior probabilities, and the results of the field comparisons may include: match, no match, and absent. Similarly, the analyzed records may be categorized as duplicates, not duplicates, or indeterminate.

In still another aspect of the invention, a process operable on one or more computers for identifying duplicate records among a plurality of records in a database, each record having a plurality of fields, may comprise: setting a threshold match probability; selecting one or more of the fields for comparison; calculating possible patterns, wherein each pattern is a different permutation of comparisons between the selected fields; calculating match probabilities for each of the possible patterns; identifying patterns having match probabilities higher than the threshold match probability; analyzing records corresponding to the identified patterns to determine whether the records are duplicates; and merging duplicate records. The threshold match probability and the match probabilities may be Bayesian posterior probabilities. The process also may include normalizing values in the selected fields prior to the analyzing step, and the removal of default data prior to the analyzing step, and analyzing the records to ascertain deterministic matches prior to performing a probabilistic analysis of the records. Moreover, the process may include: selecting one or more different fields for comparison; calculating second possible patterns, wherein each pattern is a different permutation of comparisons between the different fields; calculating second match probabilities for each of the second possible patterns; identifying second patterns having match probabilities higher than the threshold match probability; and analyzing records corresponding to identified second patterns to determine whether the records are duplicates.

The step of calculating match probabilities may include: calculating objective values relating to the fields; approximating subjective values relating to the fields; estimating an average number of duplicate records; estimating a total number of distinct duplicate records using the subjective values; determining a probability of a match between the records using the estimates; determining a probability of no match between the records; determining a conditional probability of a match between at least one of the fields of the records, given a match between the records, using the subjective values; and determining a conditional probability of a match between at least one of the fields of the records, given no match between the records, using both the objective values and the subjective values. The objective values may include one or more of: a percentage of defined values; a number of defined values; a number of defined values having frequencies greater than 2; and an average frequency, and the subjective values may include one or more of: a prevalence of duplicates among the records; an error factor for the fields; a confidence factor for the fields; a permanence of the fields; and an estimated sample proportion for a confidence level. Additionally, the analyzing step may comprise sorting the records into high probability, low probability, and indeterminate matches. Moreover, the process may be carried out on a system that includes a database, at least one middle tier, and a user interface.

These and other features and advantages are evident from the following description of the present invention, with reference to the accompanying drawings.

BRIEF DESCRIPTION OF THE SEVERAL VIEWS OF THE DRAWINGS

FIG. 7 is a screenshot of an exemplary transaction list.

FIG. 8 is a screenshot of an exemplary transaction record.

FIG. 11 is a screenshot of an exemplary iMPI display allowing for removal of default field values.

FIG. 12 is a screenshot of an exemplary execution log display.

FIG. 13 is a screenshot of an exemplary synonyms display and management screen.

DETAILED DESCRIPTION

An iMPI system that includes at least one database and a set of middle tier objects, such as COM objects or web services. Client applications may communicate with the system through an XML communications protocol. System data may be organized and managed through a data manager for at least three different purposes: to configure parameters for the process matching algorithms, to execute the process matching algorithms that will result in organized transactions, and to review the transactions.

One goal of the MPI system may be to reduce or eliminate the need for human decision-making. To this end, the system employs an effective comparison process initially based on a multi-membership Bayesian method. This process relies on a complex but fast mathematical formula in order to obtain posterior probabilities of potential matches, as discussed in greater detail below.

The MPI system referred to herein may be called iMPI, with the i representing the intelligence with which the system performs. It in effect learns over time how best to match any given patient. Building upon historical data, i.e., that data which has been encountered in the past, in order to analyze and potentially match future records with that historical data may be a key attribute.

Another advantage of iMPI is that it is applicable to a wider variety of applications than simply tracking personal data. While important, the notion of pattern matching on patient data within the healthcare industry is a fairly narrow scope. The iMPI system has significantly more applicability, to the point of not even using terms representing human-based records such as patient or care providers, so that iMPI can be used for pattern matching in a much wider arena of applications. To name but a few examples, iMPI could be used in computer applications within banking, financial, or insurance sectors, and store data that may not have anything to do with actual persons.

Figure 1:
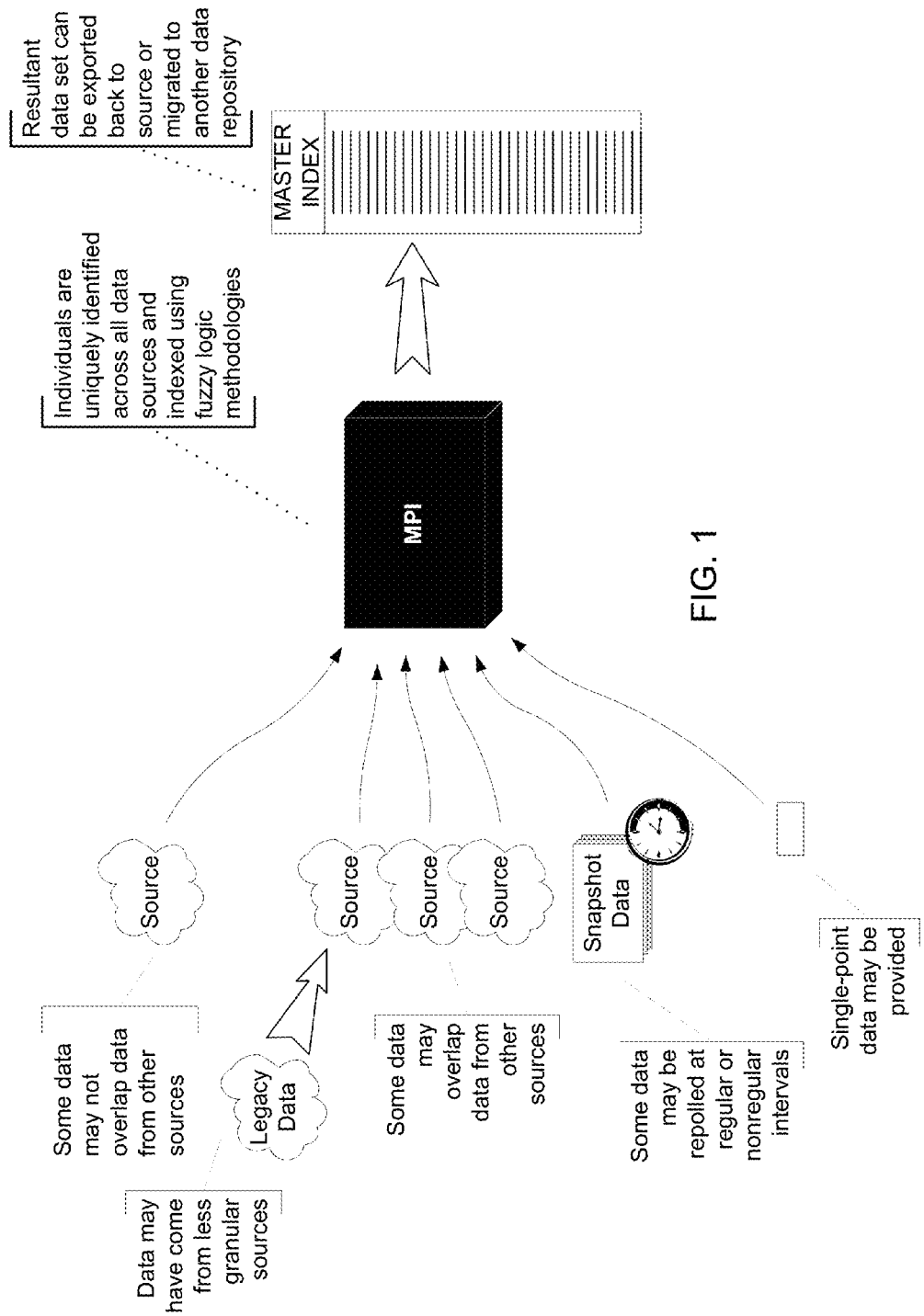
FIG. 1 is a schematic of an exemplary iMPI use case or infrastructure.

FIG. 1 shows an iMPI typical use case. A typical iMPI in a medical organization could be a central database of patients for aggregating, e.g., a plurality electronic medical records, financial or back office systems, laboratory systems, and radiology systems.

Administration Tool Support

The iMPI Administration Tool may comprise at least two sections, e.g., a management section and a transaction review section. Each of these sections may include various subsections. For example, the management section may include data cleansing and normalization, synonym management, statistics management, and execution management.

Management Section: The management section may manage the parameters and cleansing of data for future iMPI transactions.

Data Cleansing allows the removal of default values, e.g., a SSN of 000-00-0000. In addition, it may include data normalization, e.g., in an address, AVE., Ave., and Avenue are all considered to be the same and may be normalized to a common value of Ave.

With respect to data normalization, a field comparison is a string value to value comparison. Depending on the nature of the field supporting the value, a normalization function may be employed. The value normalization function is used to normalize the value before any string comparisons, in order to remove noise surrounding values. Value normalization functions may include the following, although other functions are possible:

AlphaUpper: A string is normalized to be upper case, and only to include 'A' to 'Z' characters.

AlphaNumUpper: A string is normalized to be upper case, and only to include 'A' to 'Z', '0' to '9' characters.

Numeric: A string is normalized to be upper case, and only to include '0' to '9' characters.

Soundex: A string is normalized as a soundex value, using a derivative of the soundex algorithm;

AddressNormalization: A string is normalized to fit address string patterns as defined by the US Postal Service.

Synonym management manages field level synonyms for any field. For example, in first name fields, ROBERT and BOB may be deemed synonyms. In another example, this also may allow an institution to maintain its records after the institution changes names, e.g. Hospital A may change its name to Care Provider A. Synonyms may be generally accepted and/or locally recognized values.

Statistics management may include setting up probabilistic parameters for the iMPI process matching algorithm. Refer to the Probabilistic Analysis section for more information.

Execution management may include setting up execution parameters, launching the iMPI matching process, and reviewing the execution states and logs.

Transaction Review Section: This section may review the results, reflected as transactions, of the iMPI matching process, review the state of a master database, and allow the user to either merge, close, mark as insufficient, or roll back a transaction. Refer to the Data Analysis Workflow section for more information.

Data Analysis Workflow

The User Interface workflow is designed to review the results, reflected as transactions, of the iMPI matching process. This workflow may detect duplicates, and resolve these duplicate records by merging them. The workflow may address four use cases:

1. Merging two records together that were determined to be duplicates;
2. Closing a transaction that was determined to not be a duplicate;
3. Marking as insufficient a transaction that will never have enough field elements to properly determine whether there would be a duplicate; and
4. Rolling back a transaction where two records erroneously were merged.

Figure 2:
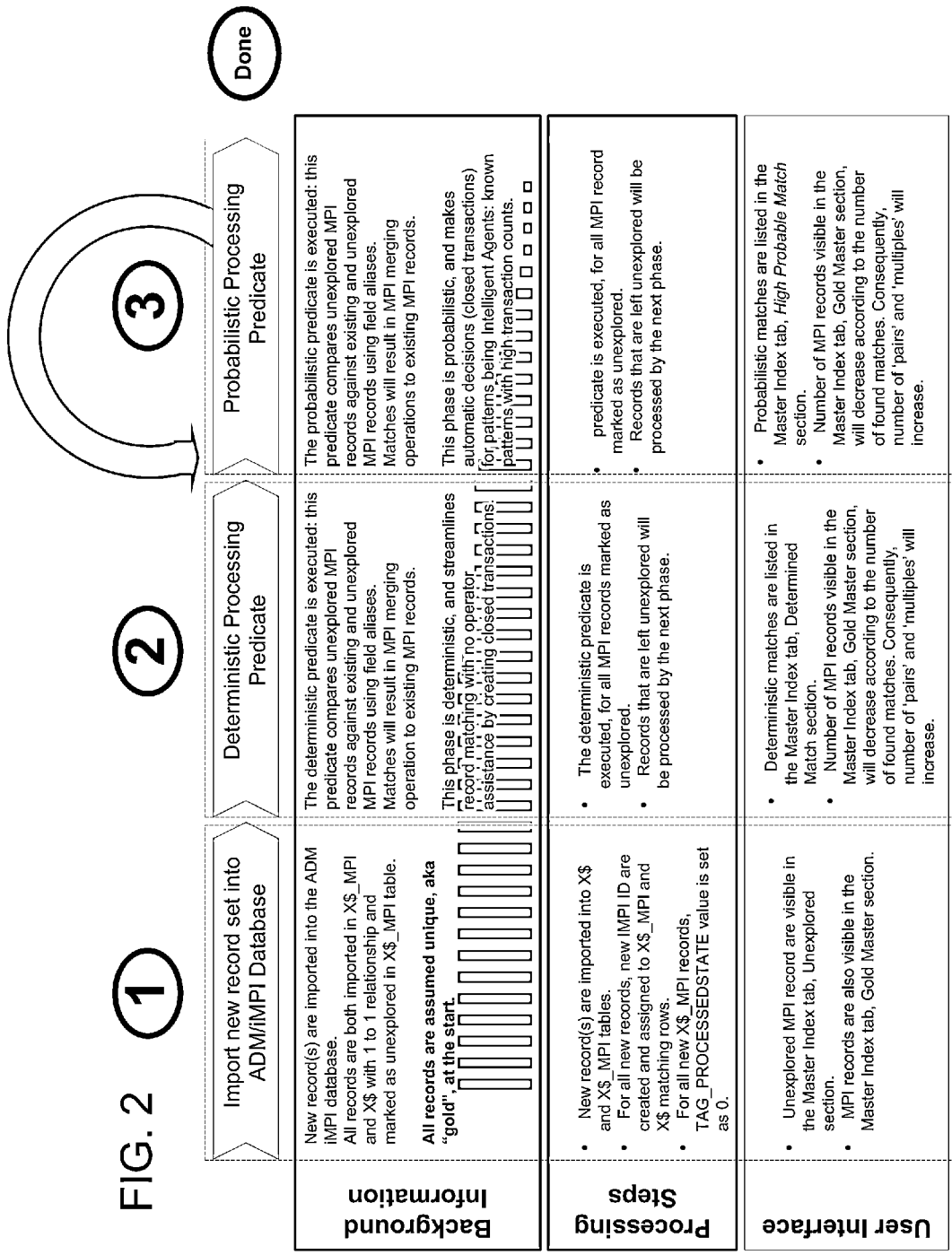
FIG. 2 is a schematic of an exemplary system work flow.

FIG. 2 shows this work flow, with expectations related to background understanding, processing steps and user interface behavior.

iMPI Merge Operation

For transactions where record A is linked to record B by a particular pattern, and the user determines the pattern and/or the individual transaction represent a single record or multiple records that are duplicate, the following steps may occur for each merge operation:

1. In the iMPI database, i.e., the X$_MPI table, record A is merged to record B and A is assigned B's MPI identifier.
2. In the X$_MPA table, A's field aliases are assigned to B. In addition, record A field aliases are removed from the X$_MPA table.
3. In the list of candidate records, i.e., the X$ table, record A is assigned record B's MPI identifier.
4. Additional processes are triggered to indicate to external systems that A was merged to B.
5. The transaction is marked as merged. As such, A's MPI is now B's MPI value.

iMPI Closing Operation

For transactions where record A is linked to record B by a particular pattern, and the user determines the pattern and/or the individual transaction represent a single record or multiple records that are not duplicate, the following steps may occur for each close operation:

1. The transaction is marked as closed.

iMPI Insufficient Data Operation

For transactions where record A is linked to record B by a particular pattern, and the user determines the pattern and/or the individual transaction represent a single record or multiple records that will never have enough data to determine high quality matching, the following steps may occur for each insufficient data operation:

1. The transaction is marked as having insufficient data.

iMPI Roll-Back Operation

When record A has been merged erroneously to record B, the following steps may occur for the roll-back operation:

1. In the iMPI database, i.e., the X$_MPI table, record A is assigned a new MPI identifier.
2. In the X$_MPA table, A's field aliases are created, and they are unassigned from B.
3. In the list of candidate records, i.e., the X$ table, record A is assigned the new MPI identifier.
4. Additional processes are triggered to indicate to external systems that A was split from B.
5. A transaction is created and is marked as rolled-back. As such, A and B are now two distinct records.

Workflow Real-Time Operation

Real-time operations may comprise processing a record as soon as it appears as a record with potential duplication. Predicates used for batch processing can be extended and used to be executed in sequence to process one record at a time.

Probabilistic Analysis

In standard Boolean logic, only two states exist: true and false. Put differently, when comparing two items in a Boolean system, the question, "Are these two items the same?" can only be answered "Yes" or "No." However, in data analysis it is often the case that not all the information required to make such a determination is known. This is true especially when comparing large amounts of data, as it often may be the case that certain pieces of information are lacking. For example, consider this table of personal data:

|  | Record 1 | Record 2 |
| --- | --- | --- |
| Name | Doe, John | Doe, John |
| SSN | 123-45-6789 |  |
| DOB | 12/7/1983 | 12/7/1983 |
| Address | 123 Northbrook Way | 99 Main Street |
| Phone Number | 773-555-1234 | 773-555-1234 |

It is clear that the name, date of birth and phone number of each record is identical. The address is certainly different and John Doe's social security number in the second record is absent. In cases such as these, it is useful to add a third state to the usual "yes" and "no" states given above. The three resulting possible states can be described as the following:

| Data Present? | | | |
|---|---|---|---|
| Record 1 | Record 2 | Data Matched? | Assigned State |
| Y | Y | {Y / N} | Present/Matched Present/Unmatched |
| Y | N | n/a | Absent |
| N | Y | n/a | |
| N | N | n/a | |

Duplicate detection may comprise comparing every record against every other record and testing some, if not all, record columns one-to-one, with column comparison results possibly being:

(+): Both values present and matching;
(−): Both values present and not matching; or
(a): for "absent," i.e., one or both values not defined.

Bayes' Theorem provides a tool used to compute posterior probabilities given certain observations, where a posterior probability is the conditional probability taken only after all the wanted observations occur. As an example, consider the probability of pulling items from a bag. Suppose that Bag #1 contains 2 balls, one Red and one Green. Bag #2 contains two balls as well, but both are Red. In this experiment, a ball is chosen at random from Bag #1. If the ball is Green, the ball is returned and another ball is chosen from Bag #1 again. If the ball was Red, then a ball is chosen from Bag #2. Let A be the event that the first ball selected was Red, and B be the event that the second ball pulled was Red. Since there is one ball of each color in Bag #1, we know that $$P(A) = \frac{1}{2}.$$

This is a value that can be calculated before completing the experiment and this type of probability is called an apriori or a prior probability. But, if something is known about an event B, what we can say about A changes. Suppose, for instance, that is known that a Red ball is chosen on the second pull. What is P(A) now? The question typically asked is "what is the probability that the first ball was Red given the second ball was Red?" and written as P(A|B) (read "probability of A given B"). Bayes' Theorem states that $$P(A \mid B) = \frac{1}{3}.$$

This revised probability is the posterior probability, which is only calculated after information about event B is known.

In the data analysis that iMPI performs, the question to be answered is at what level of certainty are two records in a database the same with respect to a set of conditions with each field that is analyzed falling into one of the three above states. To answer such a question, it is necessary to compute the posterior probabilities for the relevant fields as in the example above. For instance, we must have the probabilities that the field "Name" matches given that two records are the same and that "Name" matches given that two records are not the same. However, it is impossible to compute this probability exactly without solving the duplicate problem entirely. Thus, the posterior probabilities must be estimated and the next section describes a heuristic process for estimating these probabilities for use in iMPI.

Heuristic for Estimating the Posterior Probabilities

We developed a heuristic or process for estimating the posterior probabilities using detailed objective knowledge about the data set and more precise, subjective data to better estimate the importance of a field and how it applies to the multi-membership Bayesian process.

Broadly proceeding, this version of iMPI relies on the following objective values by field within a certain data set: the percentage of defined values, the number of defined values, the number of defined values that have frequencies greater than 2, and the average frequencies of values that have frequencies greater than 2.

The values of a field are the possible entries for that field, e.g., "Smith" is a value in the "last name" field, and however many times Smith occurs as a last name in the data set is its frequency:

In addition, the following subjective values by field may be set for a certain data set:

Prevalence—An estimate for the percentage of duplicates within a data set,

Error—The numerical estimation of the percentage of data entry or mechanical and computer errors in a field, Confidence—

The numerical estimation of the user's confidence or trust in a particular field, and Permanence—The numerical estimation of the transitory nature of a field or how often an element in that data field is expected to change.

Probability Pre-Processing

The probability that a given entity is the same as another entity is based on which attributes of the transaction entities match, which do not, and which are not available (i.e. have no value). The probability that the values of a field match given that the entities also match may be called P-values, and the probability that the values of a field differ though the entities match may be called $\overline{P}$-values (Pbar-values). The P and $\overline{P}$ values are both factored into the computation of the posterior probabilities. Since probabilities are always measured between 0 (definitely not a match) and 1 (definitely a match), the computation will never result in a negative number.

Figure 3:
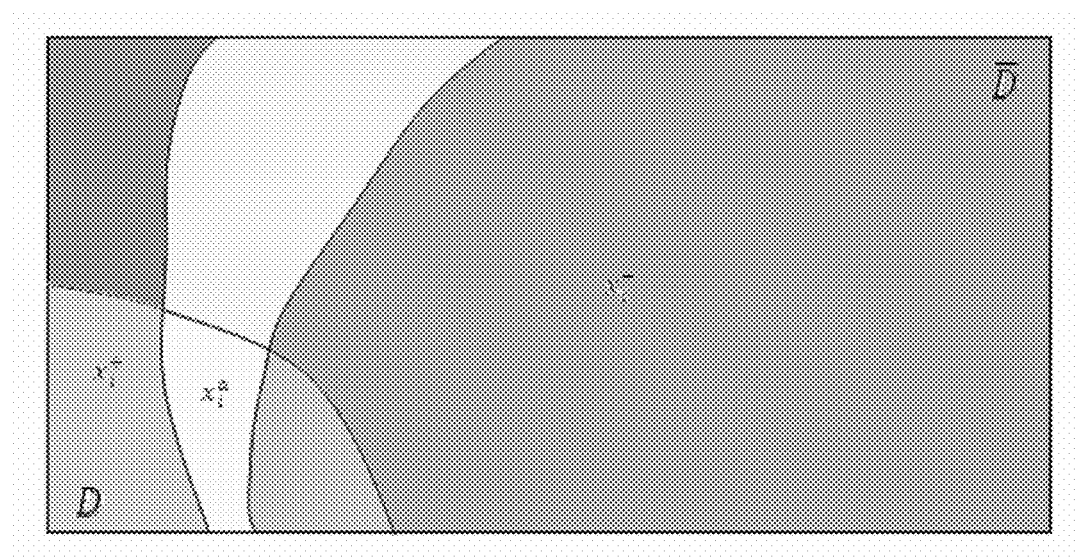
FIG. 3 is an exemplary probabilistic distribution for matches and non-matches, separated by field comparison status.

For example, referring to FIG. 3, an exemplary distribution of record matches and non-matches for a database is shown. Matches, represented by D, are shown in the lower left-hand corner and can be separated by field status where a given field $x_i$ matches (+), is absent (a), or does not match (−). Similarly, non-matches, represented by $\overline{D}$ fill the remainder of the set and also can be separated by field status into matches, absent, or non-matches.

Estimating P (D), i.e., the probability of two random records, $R_j$ and $R_l$, matching may include the following steps:

Consider the database has N records.

The number of ways to choose two records from the data set is:

$$\binom{N}{2} = \frac{1}{2}N(N-1)$$

Assuming an average number of duplicates (among records with duplicates, represented by k) and a user defined value for the percentage of duplicates (prevalence, represented by $\mathfrak{P}$, fraktur P), an estimate for the total number of distinct duplicates may be the number of duplicates divided by how often a record is duplicated. As such, the probability, P(D), may be the estimated total number of distinct duplicates multiplied by the number of ways to choose an average number of duplicates, divided by the number of ways to choose two records from the data set $$P(D) = \frac{\frac{\mathcal{P} \cdot N}{k} \cdot \binom{k}{2}}{\binom{N}{2}} = \frac{\mathcal{P} \cdot N \cdot (k^2 - k)}{k \cdot (N^2 - N)}$$

In addition, the system may calculate the probability, $P(\overline{D})$, of the two records not matching, which is defined to be $1-P(D)$.

At the outset, the value chosen for the average number of duplicates is subjective, since it is impossible to calculate objectively without having completed the duplicate analysis already. However, in one embodiment, the system at first may provide a subjective estimation for this value, which may be updated using objective results during the duplicate analysis process. This updating process may yield a value that is more specific and more closely tied to the data being analyzed.

Each record may comprise i fields, represented as $x_i$, and the conditional probability of field $x_i$ matching in records $R_j$ and $R_l$, given that records $R_j$ and $R_l$ match, may be represented as:

$$P_i = P(x_i^+ | D)$$

Each record's field value may contain an error factor that may represent the value not matching due to errors such as, but not limited to, data entry, even though the records themselves do match. This error factor may be user defined and, in one embodiment, may be about 5%.

In addition, each field may have a user-defined trust or confidence factor. A higher confidence level will produce greater effect on the hit posterior probability when field values are present and matched. Preferably, confidence values are limited to between 0 and 1 so that $0<P_i<1$.

Moreover, fields may have a permanence factor, reflecting the transitory nature of the fields or how often the data in the field is expected to change. Permanence values also are limited to between 0 and 1 so that $0<P_i<1$.

The system makes use of these factors in determining the probability of each field matching, or $P_i$, since that probability is a function of the probability of the error, the confidence factor, and the permanence factor.

Conversely, to calculate the posterior probability of matching records, the system determines the probability that field data matches even though the considered entities are not equivalent, i.e., the probability of a false positive. This field-specific probability may be represented as $\overline{P}_i$, and it may represent the inherent distinctness of a field element.

The conditional probability $\overline{P}_i$ may be the probability that field $x_i$ matches and the two records do not. This in turn may be defined as:

$$P(x_i^+ | \overline{D}) \stackrel{def}{=} \frac{P(x_i^+ \cap \overline{D})}{P(\overline{D})}$$

The probability of the intersection of each field's values matching and the records not matching is equal to the probability of the entire set of fields $x_i$ matching, less the probability of the intersection of each field matching and the records matching.

Calculating $P(x_i^+)$ requires estimating the average frequency of duplicates in the field and the average frequency squared. Starting with:

$$P(x_i^+) = \frac{\text{\# of field value matches}}{\text{\# of pairs of field elements}}.$$

Use $$\frac{1}{2}\hat{N} \cdot (\hat{N} - 1),$$

where $\hat{N}$ is the number of defined field values. Let $\alpha$ be a duplicated field value located on field i, $\beta_\alpha$ is the number of occurrences in the database for each such $\alpha$.

Using substitution, $$\frac{1}{2}\beta_\alpha \cdot (\beta_\alpha - 1)$$

is the number of possible ways in which to randomly select two records whose $i^{th}$ field value is $\alpha$.

The calculation of the total number of matches on a prescribed field is too costly, so we may approximate, and the average number of frequencies (greater than or equal to 2) and the number of different field values whose frequencies are greater than or equal to 2 (number of different field duplicates) may be used.

Defining $\mathcal{D}$ to be the number of different field duplicates, $\hat{\beta}$ to be the average frequency of a duplicated value, and $\tilde{\beta}$ to be the average of the squared frequencies, the total number of matches for a single field may be rewritten as:

$$\frac{1}{2}\left(\sum_\alpha \beta_\alpha^2 - \sum_\alpha \beta_\alpha\right) = \frac{1}{2}(\mathcal{D}\tilde{\beta} - \mathcal{D}\hat{\beta}) = \frac{1}{2}\mathcal{D}(\tilde{\beta} - \hat{\beta}).$$

Finally, $P(x_i^+)$ may be a function of the total number of matches and the number of ways to choose two field values.

Turning to the calculation of $P(x_i^+ \cap D)$, the probability of the intersection of the field's values matching and the records matching is equal to the probability of the records matching, less the probabilities of the records matching and the fields not present/matched.

Since $$P(x_i^- | D) = \frac{P(x_i^- \cap D)}{P(D)},$$

we have $P(x_i^- \cap D) = P(x_i^- | D)P(D) = E_i \cdot P(D)$, where the error $E_i$ previously has been defined to be $P(x_i^- | D)$.

Determining $P(x_i^\alpha \cap D)$ based on knowledge about the set of two-record pairs may require the use of a confidence interval. This interval may be a function of the estimated sample proportion, r, which may be determined from the population proportion $\pi$, the population standard error $\sigma$, and the normal test statistic value for a given confidence level, z*, according to the interval: $r \in (\pi - z^*\sigma, \pi + z^*\sigma)$.

Using the population statistic %-defined, for a given field i, denote by $\pi_i$ the %-defined for field $x_i$ in the entire database (our population statistic), and setting the confidence level, a double-sided tail is used for a normal curve to find the normal statistic z* at the prescribed level. Any confidence level may be selected, e.g., about 99% in one embodiment.

$r_i$ is just an estimate that lies within the resulting confidence interval. In total, the probability $P(x_i^\alpha \cap D)$ is the complement of the proportion $r_i$ inside P(D).

From the above, $P(x_i^+ \cap D)$ can be determined.

Hence, $$\overline{P_i} = \frac{P(x_i^+) - P(x_i^+ \cap D)}{P(\overline{D})} = \frac{\frac{\mathcal{D} \cdot (\tilde{\beta} - \hat{\beta})}{\hat{N} \cdot (\hat{N} - 1)} - P(D)(1 - E_i - (1 - r_i))}{P(\overline{D})}.$$

For this equation, the %-defined estimate for $r_i$ may be selected from anywhere between its upper and lower bound. In one embodiment, the lower bound may be used.

Calculating the Hit Posterior Probability

Once the system defines values for $P_i$ and $\overline{P}_i$, it may employ a traditional Bayesian analysis to determine the Hit Posterior Probability (HPP), or the probability that two records match, given matches, no matches, or insufficient data on all considered fields to determine the existence of a match for the selected fields within those records. This probability, HPP, which is $P(D| x_1^{\eta_1}, \ldots, x_k^{\eta_k})$, also may be represented as:

$$HPP = P(D | x_1^{\eta_1}, \ldots, x_k^{\eta_k})$$
$$= \frac{P(D)f(x_1^{\eta}) \ldots f(x_k^{\eta})}{P(D)f(x_1^{\eta}) \ldots f(x_k^{\eta}) - P(\overline{D})\overline{f}(x_1^{\eta}) \ldots \overline{f}(x_k^{\eta})}$$

where $$f(x_i^{\eta_i}) = \begin{cases} P_i & \text{for } \eta_i = + \\ 1 & \text{for } \eta_i = a \\ 1 - P_i & \text{for } \eta_i = - \end{cases}$$

and $$\overline{f}(x_i^{\eta_i}) = \begin{cases} \overline{P_i} & \text{for } \eta_i = + \\ 1 & \text{for } \eta_i = a \\ 1 - \overline{P_i} & \text{for } \eta_i = - \end{cases}$$

For each known entity in the most relevant match set, each attribute of the client entity may be compared and contrasted to the known entity attributes. Each attribute where a positive match is made contributes both its P value and $\overline{P}$ value to the computation. Each attribute where no match is made contributes a (1–P) value and (1–$\overline{P}$) value to the computation. No contributions are made either way where there is no client data for that attribute. For example, although a weight set may support Social Security number values, the SSN contribution would not exist for persons for which an SSN is unknown.

In one embodiment, the hit posterior probability may be resealed via a function for user convenience. Such a function would better differentiate between probabilities close to 100%.

Patterns iMPI may rely on, but does not require, a data manager such as the Adaptive Data Managers (ADM) described in the commonly-assigned U.S. Pat. No. 6,904,432 or U.S. patent application Ser. No. 11/065,600. This data manager may serve as a meta data database management system to (a) define a meta data layer and (b) manage the tables driven by the meta data.

Broadly proceeding, record set duplicate analysis using ADM & iMPI may comprise:

1. Having access to the initial dataset, having duplicate records;
2. Defining a meta data set that will allow storage of the initial dataset in the ADM repository;
3. Selecting the meta nodes that will participate in duplicate detection;
4. Executing meta node statistical analysis;
5. Removing default data;
6. Defining parameters for each selected meta node;
7. Executing iMPI duplicate analysis detection phase; and
8. Reviewing results, possibly leading to merging records.

Continuing to use the example of personal demographic information, this time specifically represented in a medical record patient list, patient data record columns may include:

First Name;
Last Name;
Date of Birth;
SSN;
Gender;
Phone Number;
Address;
Email Address; and
Maiden Name.

When used in an ADM paradigm, this list may become a meta data list belonging to the Patient Meta data. In this case, in relation to the cleanliness of the patient data, the system (e.g., through the most relevant attribute flags discussed below) or a user may select the following meta nodes that will participate in duplicate detection:

First Name;
Last Name;
Date of Birth;
SSN;
Phone Number; and
Address.

As discussed above, duplicate detection may have one of the following results for each compared field:

(+): Both values present and matching;
(−): Both values present and not matching; or
(a): for "absent," i.e., one or both values not defined.

In this example, we only consider 6 meta nodes for comparison. Each meta node comparison can lead to 3 states, (+), (−), and (a). As such, the total permutation number to compare 2 records is the (number of states) elevated to the power of the (number of meta nodes). Here, a single permutation comprises some or all meta nodes, with a state, for example '1(+)2(−)3(+)4(+)5(+)6(+).' Each possible permutation will be referred to herein as a pattern, and two records matching using a pattern may be referred to herein as transaction records. In this example, for six comparison fields and three states, there are at most $3^6=729$ possible patterns to compare 2 records.

In order to proceed to a multi-membership Bayesian computation, parameters are assigned to each meta data as a representation of the importance of the data, i.e. the patient data in our example.

Consequently, using the parameters and multi-membership Bayesian analysis, the system can compute the probability for all possible patterns. For example, the table below shows a sample of the various patterns with exemplary Hit Posterior Probabilities that the records match, sorted by probability.

| Probability | Discrete Matches |
|---|---|
| 0.9979 | 1(+) 2(+) 3(+) 4(+) 5(+) 6(+) |
| 0.9941 | 1(+) 2(+) 3(a) 4(+) 5(+) 6(+) |
| 0.9937 | 1(+) 2(+) 3(−) 4(+) 5(+) 6(+) |
| 0.9931 | 1(a) 2(+) 3(+) 4(+) 5(+) 6(+) |
| 0.9925 | 1(−) 2(+) 3(+) 4(+) 5(+) 6(+) |
| 0.9897 | 1(+) 2(a) 3(+) 4(+) 5(+) 6(+) |
| 0.9892 | 1(+) 2(+) 3(+) 4(a) 5(+) 6(+) |
| 0.9882 | 1(+) 2(+) 3(+) 4(+) 5(+) 6(a) |
| 0.9880 | 1(+) 2(−) 3(+) 4(+) 5(+) 6(+) |
| 0.9873 | 1(+) 2(+) 3(+) 4(−) 5(+) 6(+) |
| 0.9863 | 1(+) 2(+) 3(+) 4(+) 5(a) 6(+) |
| 0.9859 | 1(+) 2(+) 3(+) 4(+) 5(+) 6(−) |
| 0.9829 | 1(+) 2(+) 3(+) 4(+) 5(−) 6(+) |
| 0.9807 | 1(a) 2(+) 3(a) 4(+) 5(+) 6(+) |
| 0.9793 | 1(a) 2(+) 3(−) 4(+) 5(+) 6(+) |
| 0.9790 | 1(−) 2(+) 3(a) 4(+) 5(+) 6(+) |
| 0.9775 | 1(−) 2(+) 3(−) 4(+) 5(+) 6(+) |
| 0.9713 | 1(+) 2(a) 3(a) 4(+) 5(+) 6(+) |
| | [ . . . ] |
| 0.0249 | 1(−) 2(−) 3(−) 4(a) 5(−) 6(−) |
| 0.0247 | 1(a) 2(−) 3(a) 4(−) 5(−) 6(−) |
| 0.0246 | 1(−) 2(a) 3(−) 4(−) 5(−) 6(−) |
| 0.0231 | 1(a) 2(−) 3(−) 4(−) 5(−) 6(−) |
| 0.0226 | 1(−) 2(−) 3(a) 4(−) 5(−) 6(−) |
| 0.0212 | 1(−) 2(−) 3(−) 4(−) 5(−) 6(−) |

A typical multi-membership Bayesian computation comprises comparing all records against every other record (n*(n−1)/2 possibilities) and, for each comparison, computing the probability using approximately 7 floating point CPU operations. For a one-million record dataset, this translates to about $3.5*10^{12}$ floating point computations.

For best computation performance, the system only considers records that will match at or above a selected HPP threshold, such as 0.8. In other words only records that meet or exceed a certain threshold present a potential possibility of relationship, either as duplicated records, or as related but dissimilar records. Traditional multi-membership Bayesian computation does not allow for only computing a portion of the results. Instead, all comparisons must be computed and sorted to effectively draw out the few thousands among many billions of possibilities that will represent interesting matches.

Patterns present a different computational approach:

The system can pre-compute all patterns and associated probabilities. This is not comparing all records to see which patterns are found. Rather, it is an earlier step that determines what the possible patterns may be. Again, defining a threshold, the system can isolate all patterns having probabilities above a threshold that will present interesting matches. Following the previous example with 729 total patterns, only 68 patterns are above 0.8.

A pattern represents meta nodes matching under different states. To determine whether patterns exist, the system may build SQL statements with 'where clause' comparisons implementing the pattern conditions, and using RDBMS fast indexes. For a one-million record data set, finding all records respecting a single pattern may be executed in a matter of seconds.

In addition, as opposed to traditional multi-membership Bayesian computations, pattern computations are typically executed and processed using massively parallel computation, thereby reducing overall execution time even further.

During these computations, two records may match using multiple patterns. In this case, the system may consider the pattern with the highest probability and disregard the other patterns. For example, when comparing six fields in two records, if all six fields match, the system may recognize that a six-match pattern exists, as well as six separate five-match patterns, even more four-match patterns, etc. In this case, the system may note that the six-match pattern is met and disregard all other met patterns. In another embodiment, once the system recognizes that a higher-probability pattern exists, it may not analyze those two records for other lower-probability patterns.

In addition, the system or a user may revise parameters after record comparison computations. Both subjective and objective parameters may be respectively updated or recomputed. For example, a first series of computations may assign a larger permanence, thus enhancing the P calculation, to social security number than the other fields. A second series of computations may lower the effect of social security number and increase the effect of first and last names. Changing a field parameter does not affect record-to-record comparisons, i.e., a six-field match will still be a six-field match. Instead, the parameter changes affect the Hit Posterior Probability values for each pattern, which may change the number and/or type of patterns that are represented to the end user by virtue of surpassing the HPP threshold value. In addition, the visual indication provided to the user changes, i.e. the HPP value changes, thus visually representing which potential matches are important for user review.

In still another embodiment, the system or user further may be able to vary the represented patterns by being able to alter the HPP threshold value. A higher threshold will include fewer patterns, whereas a lower threshold will include more.

Predicates

In one embodiment, the system may express patterns as RDBMS SQL queries to best utilize current technologies and to help to find sets of records that may be related as duplicate records, although other technologies may be employed. Patterns may be executed as part of a small amount of source code as a wrapper to the pattern SQL statement. Such source code wrapper may be called predicates. These predicates may be smart, independent processes able to execute pattern SQL statements, create transactions, and update the execution log, while running in a highly distributed, concurrent database environment.

Pocket Patterns: Intelligent Agents

Duplicate record processing comprises processing patterns using predicates to extract out records as transaction records. Patterns have different levels of success. On a large dataset, for patterns above a 0.8 probability threshold, patterns may be found having 10 match hits, 20 match hits, 100 match hits and even 10,000 hits. Such patterns, with high match hit frequencies, may be very few and may be considered "special." In other words, these patterns may reflect trends in the data. For example, one high-hit pattern may signify all patient duplications where the phone number had typographical errors.

Such patterns may need additional attention to answer the following questions: Does the pattern rightly reflect a trend? (and) Can we infer the same conclusion for all records? If both questions receive an affirmative answer, then an action may be attached to this pattern. For example, two or more records having this pattern match could be either merged or, conversely, determined to be distinct.

In effect, an intelligent agent is a pattern with an attached action. Every time an intelligent agent is processed using batch processing or real time processing, transactions automatically are created, actions automatically are applied, and the state of the transaction to represent the applied action automatically is set.

Learning Aspects

One role of the iMPI database may be to build a so-called master record with the goal of learning how to better match data over time. For example, a patient may be known as 'STEPHEN', 'STEVEN', or 'STEVE', with the preferred value being 'STEPHEN'. Each of these possibilities may be considered an alias. As opposed to synonyms, which may be applied to any or all records, aliases may be specific to each particular record. Here, field aliases may be a predetermination of multiple matching field values. Aliases also may be considered variations of a master patient reference record.

As the process is run and patterns are evaluated, the system can determine which patterns and which searches yield the most useful results, both in terms of identifying duplicate records and in identifying intelligent agents. Over time, the system may improve its accuracy and efficiency by identifying particularly useful searches. In addition, it may lead to better estimates for prevalence, error, confidence and permanence values, as well as the average number of duplicates in a data set. This may lead to better HPP values, higher probabilistic match values, or an increase in the HPP threshold level.

Architecture

Architecture for such a system may include the following:

ADM/iMPI Repository: Batch processing and transactional processing may rely on the same data storage mechanisms. The database may be an ADM database with iMPI extensions, and a client specific ADM meta data and iMPI configuration setup. At the lowest level the storage platform may be, e.g., an Oracle10g database.

iMPI Middle Tier and Web Services: The middle tier may be generic to all ADM/iMPI implementations. The middle tier may rely on a client specific ADM/iMPI configuration setup to handle requests from the end user application.

Custom/Client Specific Graphic user interface: The client application may be an application strictly consuming services from the ADM/iMPI middle tier. This application may be fully customizable, where a default start set may be provided, along with customization consulting services if the client does not have staff with required skill set. The development platform may be, e.g., Microsoft .Net 2.0 C#, accessing web services resources developed using Microsoft .Net 2.0 C#.

Client applications may communicate with the system through an XML communications protocol.

An example of an earlier MPI system is disclosed in commonly assigned U.S. Pat. No. 7,167,858, titled Identification Mapping and Translation Method, the disclosure of which is incorporated herein by reference.

An example of a client application is disclosed in the commonly assigned U.S. Pat. No. 7,536,387, titled Method for Interfacing Applications to Maintain Data Integrity, the disclosure of which also is incorporated herein by reference.

Examples of Data Managers are disclosed in the commonly assigned U.S. Pat. No. 6,904,432, titled Adaptive Data Manager and the commonly assigned U.S. patent application Ser. No. 11/065,600, titled Method for Adaptive Data Management, the disclosures of which are incorporated herein by reference.

Figure 4:
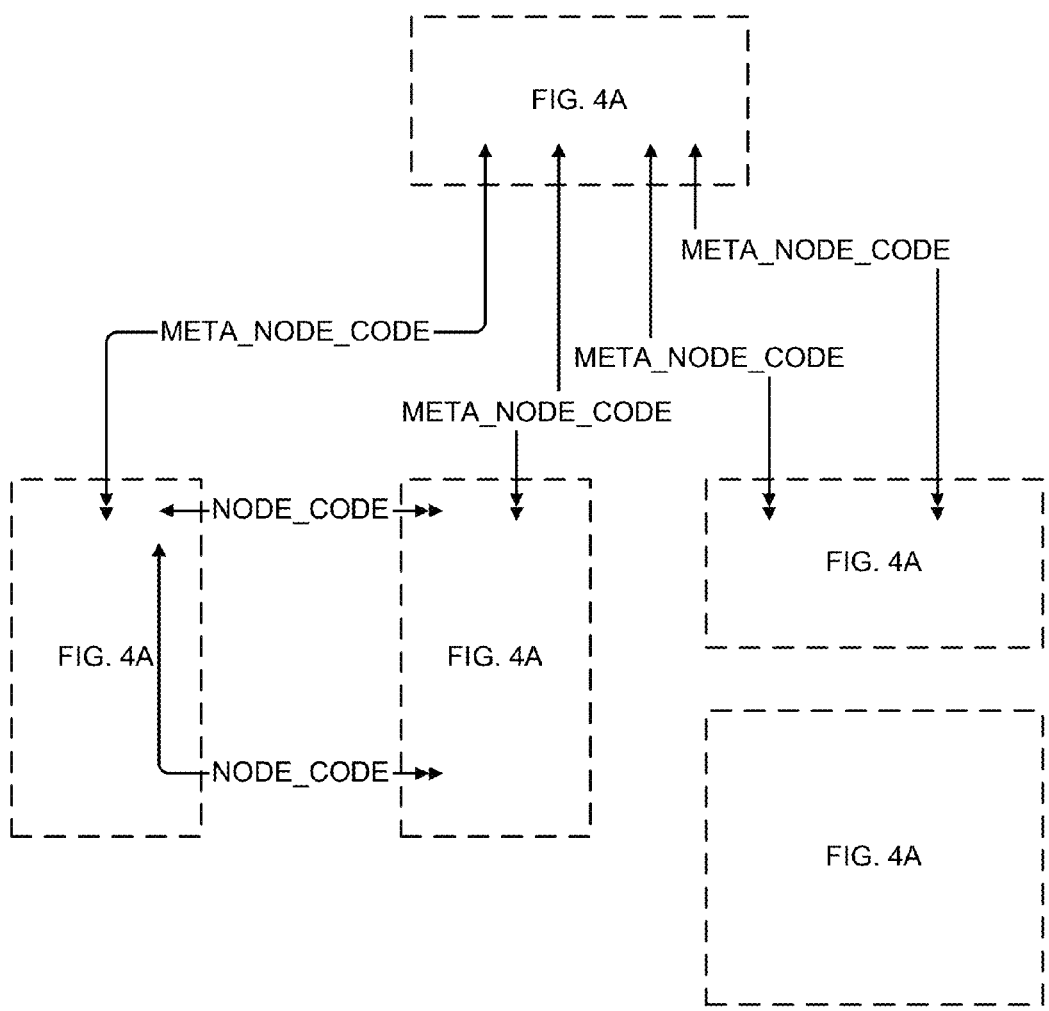
FIG. 4 is an exemplary iMPI Entity Relationship Diagram supplemental to an adaptive data manager Entity Relationship Diagram, as explained in greater detail in FIGS. 4A-4E.
Figure 4A:
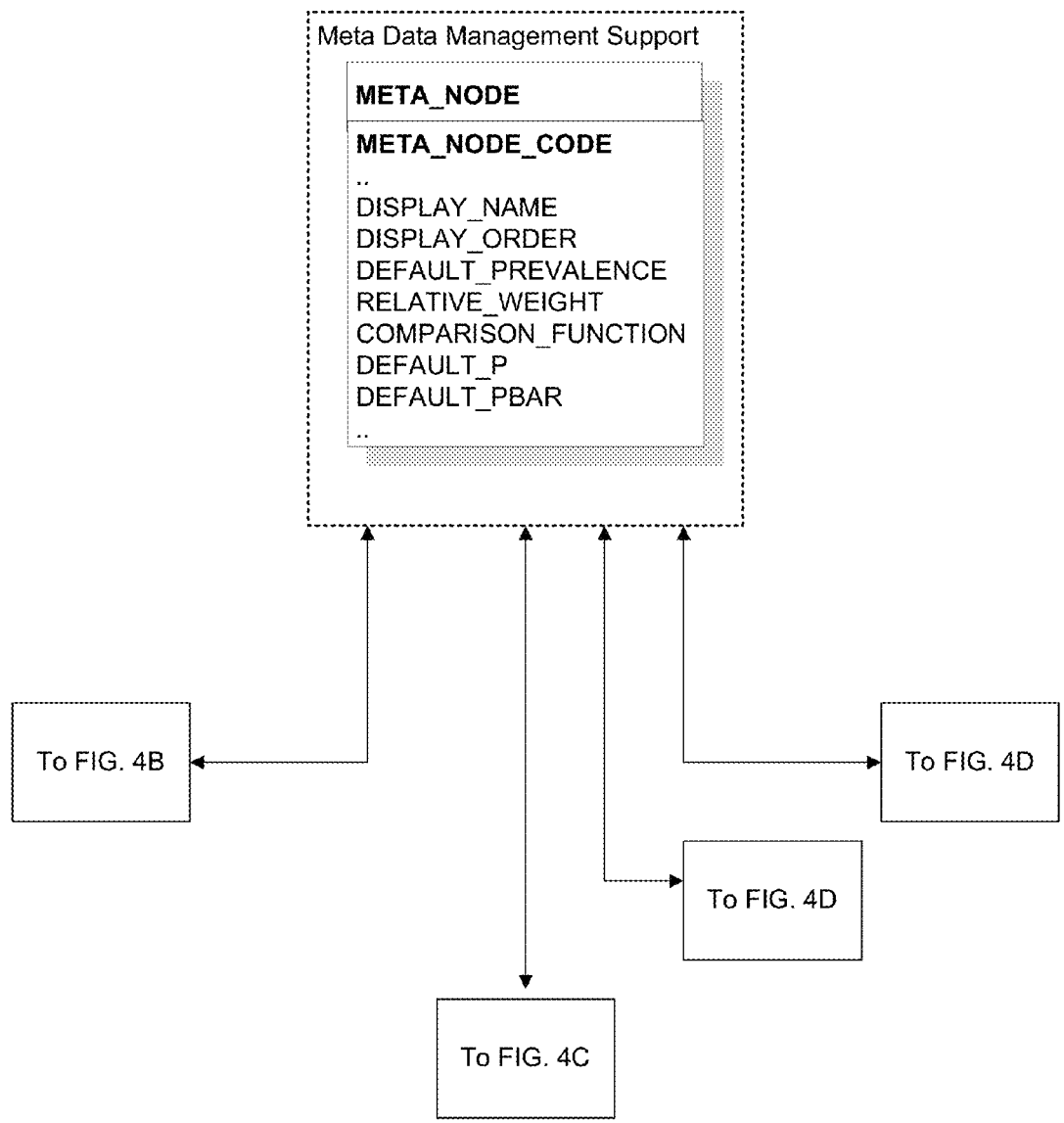
Figure 4B:
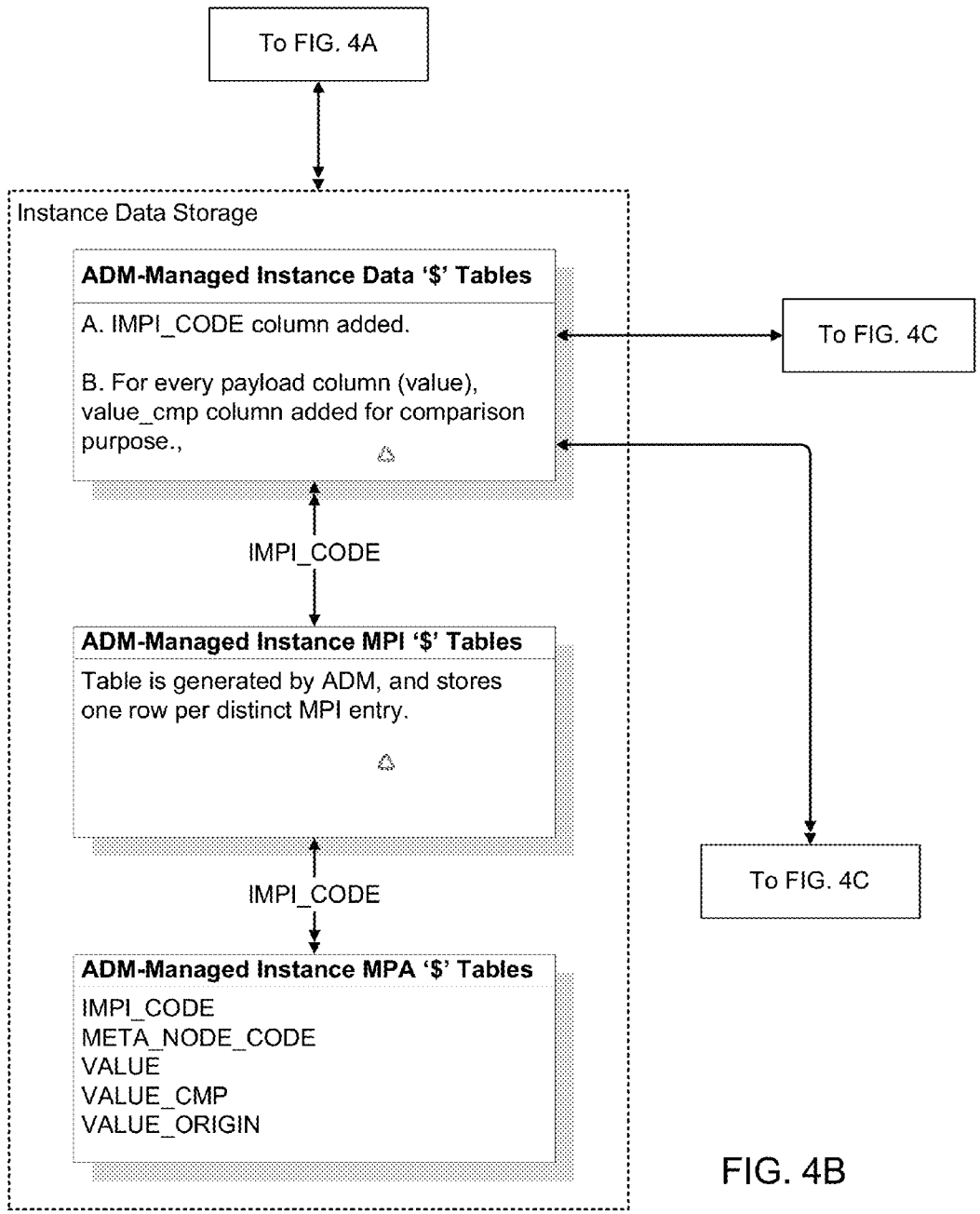
Figure 4D:
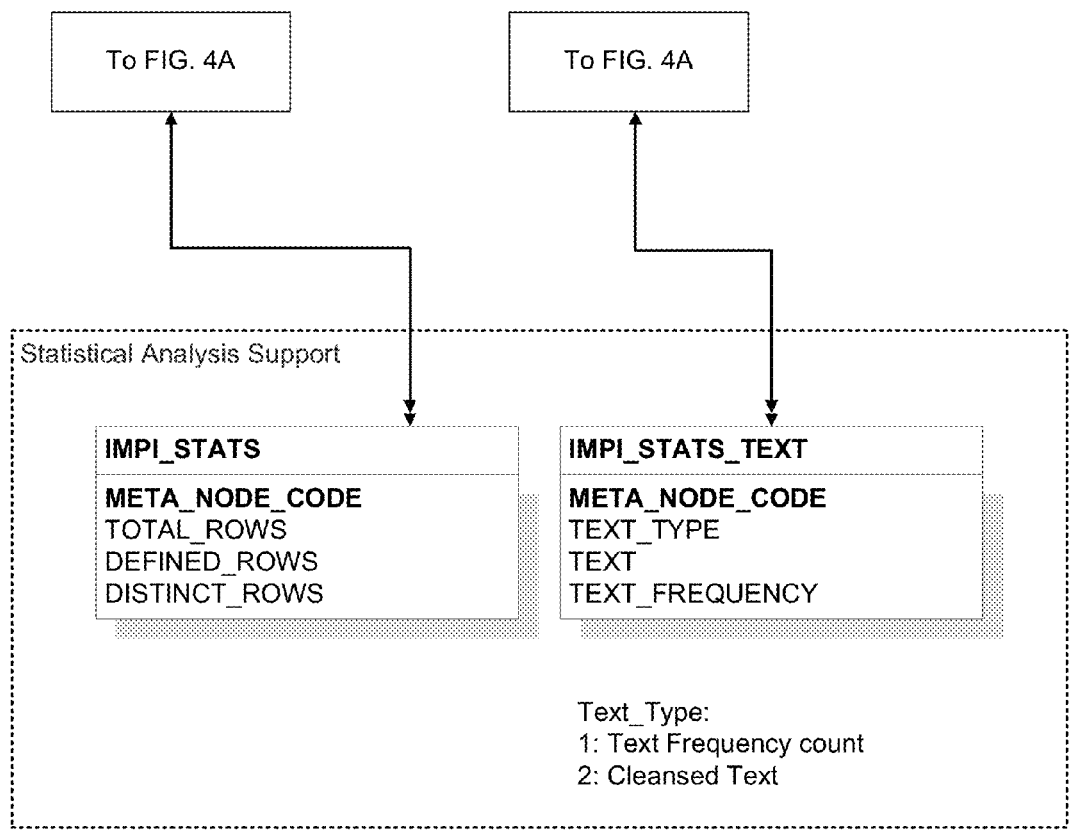
Figure 4E:
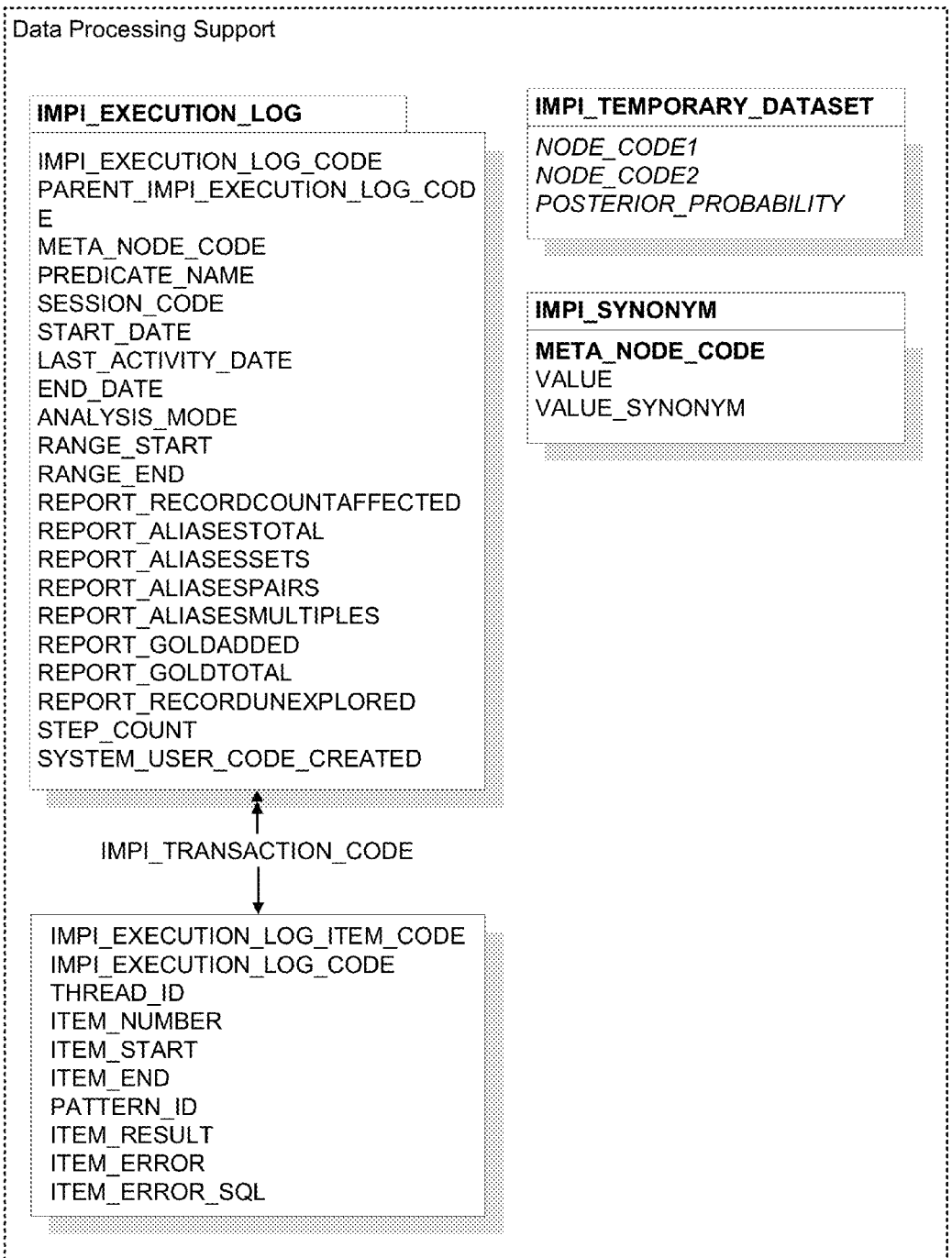

Database iMPI may be an extension of a data manager such as ADM. In other words, an ADM meta node can be flagged as an iMPI meta node and can trigger the processes and workflows surrounding identity management and duplicate record analysis. FIG. 4, as shown in greater detail in FIGS. 4A-4E, shows an iMPI supplemental entity relationship diagram as it relates to an ADM entity relationship diagram.

Candidate Data Storage and Master Record Storage

As in ADM storage, candidate data storage may be in an X$ table, as managed by meta data. When enabling a meta node as an iMPI meta node, two other tables are created:

The X$_MPI table as the master record storage: By definition, the X$ table may contain data including duplicates. For example, the X$ table may contain a record having a field with both A and A' values. In addition, the X$ table may contain a second record having the same field with a B value, and the two records may be duplicates. The resultant X$_MPI table is a de-duplicated version of the X$ table. This table is known as the gold standard for the X$ table, and there may be a one-to-many relationship between the X$_MPI and the X$ tables.

The X$_MPA table is the field alias table for the X$_MPI table, and it may contain multiple aliases for a field, as well as a preferred value that is used in the gold standard table. For example, the Gold "preferred" patient first name for a given record might be "Stephen," while field aliases might be "Stephen," "Steven," "Steve," etc. As such, there may be a one-to-many relationship between the X$_MPI and X$_MPA tables. This preferred value may default to the first value in the table, may be selected by the system, or may be user defined.

Transactions

Transactions may be stored in an iMPI transaction table. The transaction table is a candidate record with the highest probability of matched master records for that candidate record. In addition, the transaction table may store the state of the record, the state of the transaction, e.g., merged, closed, pending, insufficient data, etc., and the mode of the transaction, e.g., deterministic, probabilistic, etc.

Transaction results may be stored in an iMPI transaction result table. Transaction results may comprise the list of master records that may match to a candidate record by pattern. There may be a many-to-one relationship between the transaction results and transaction tables.

The action applied by the user or by an intelligent agent may be stored in both the transaction and the transaction result tables.

Execution Log

The execution log reflects global actions executed in iMPI, along with the resulting states. The log may track the amount of time each step took process and may provide the user with system run-time information.

Statistics

There may be two types of statistics: objective data that can be calculated from the database and subjective values that represent default data removed from probabilistic calculations. Objective data may include, e.g., the number of records in the database, the number of defined values by field, etc. Subjective values may include, e.g., the excluded default values.

Synonyms

The system may maintain storage of user-defined synonyms by field.

User Interface Elements

The ADM Administration tool is a utility provided for managing the iMPI process. This tool covers two different aspects of iMPI:

Master Index: The Master Index processes transactions created by the iMPI process. In addition it allows a user to search/view/edit the master records; and Analysis: The iMPI process requires the user to analyze the data and set up parameters before starting to generate transactions for processing. User-denoted data is removed from the computations and a synonym table is built to aid the iMPI matching process in making the best possible match.

Master Index Overview

The Master Index section of the ADM Administration utility is the primary data manipulation section for the results of the iMPI process. Transaction records are processed within the various stages of the iMPI process (described later below) on their way to either be new master records or aliases to existing master records. Here you can view the transactions that were processed in each iMPI stage and manually process the data. In addition, master records can be edited to ensure completeness of the iMPI database.

Figure 5:
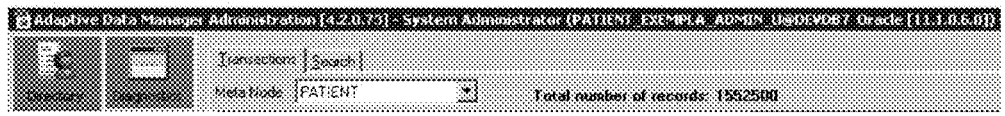
FIG. 5 is a screenshot of an exemplary iMPI master index window.

As seen in FIG. 5, the system may include two tabs on the Master Index window: transactions and search.

Transactions: Provides access to the transaction records that exist in the various iMPI process stages. The Transactions tab may display by default and may contain the main functionality of the iMPI Master Index screen.

Search: Provides searching of gold master records and/or transaction records.

There may be three sections of the iMPI Master Index Transactions tab.

Dashboard: Shows the different stages of the iMPI process.

Transaction List: Displays a list of transactions that are Pending, Closed or Merged for each selected stage.

Transaction Record: Displays the details of the selected candidate record along with either the possible matching Master Records, or the selected Master Record's Aliases.

Figure 6:
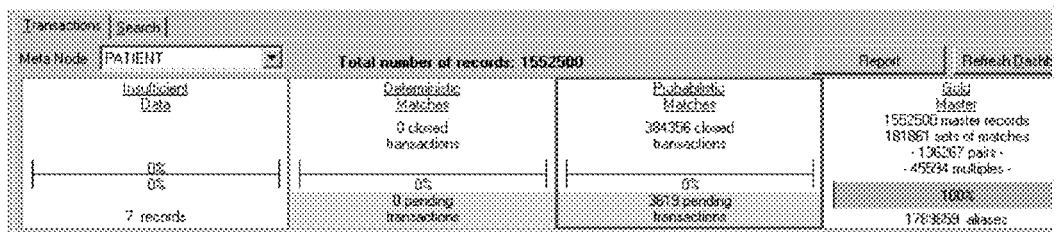
FIG. 6 is a screenshot of an exemplary iMPI dashboard.

Turning to FIG. 6, one embodiment of a dashboard is shown. The dashboard may be an interactive status bar that displays the progress of the iMPI data process, and it may include four distinct stages: Insufficient Data, Deterministic Matches, Probabilistic Matches, and Gold Master.

Insufficient Data: The Insufficient Data section contains those records that have been marked as such by either running a predicate script or manually by the user during processing. These records are generally records that do not have enough information for comparison.

Deterministic Matches: The Deterministic Matches stage utilizes a simple and direct comparison approach to decide, if all the specified fields exist and have matching values between possible records, to confirm them as a duplicate match.

Probabilistic Matches: The Probabilistic Matches stage contains those transaction records that have been determined through an iMPI probabilistic calculation to most resemble another candidate record by pattern at the resulting Hit Posterior Probability calculation. Transaction records at this stage have been provided a list of possible master records, but are a status of 'Pending' for user review.

Once a transaction record is selected, the details for the transaction record and the potential master records with their associated probabilities are displayed. Green, Yellow, and Red indicate the fields in the Candidate record that are equal (or extended equal), absent, or unequal to the respective Extended Equal Matches The system may be able to determine a field match in at least two different fashions. For example, a match may be determined by either comparing the values themselves or by using extended equal matches. An extended match is when the value is extended to additional values that are equally valid to the original value. Extended equal matches may be found, e.g., through the use of synonyms or field aliases. For example if the patient first name value is "BOB," then a "ROBERT" synonym also may be considered for comparison, and a match between "BOB" and "ROBERT" would be an extended equal match. In another example, a patient may be known as 'STEPHEN', 'STEVEN', or 'STEVE', with the preferred value being 'STEPHEN'. Another extended equal match would be a match on the field aliases of 'STEVEN' or 'STEVE'. The system may include distinct visual representation icons to distinguish between equal matches and extended equal matches.

Gold Master: The Gold Master section, or the Master Provider Index, contains all master records and their associated alias records. The gold master may be reviewed and finalized at any time during the iMPI process. Master records are either replaced or merged with their Alias records, or can be rejected entirely and merged with another, more appropriate master record.

Figures 7, 8:
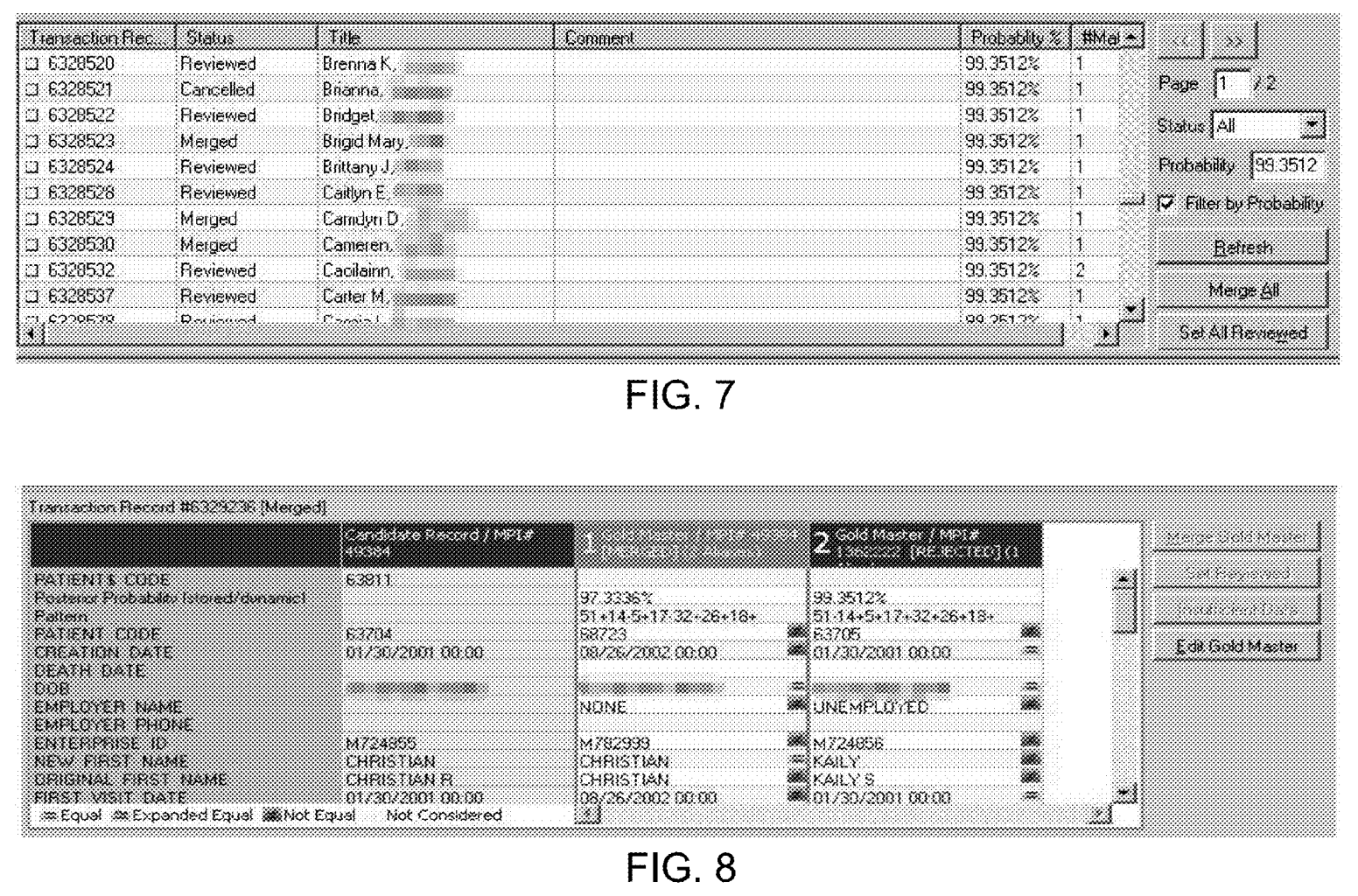

Turning now to FIG. 7, one embodiment of a Transaction List is shown. The transaction list may be a list of transactions by status for each selected stage. The transaction list section enables the user to search for transaction records based on search criteria.

Searching: Each selected stage can be searched on any attribute that exists within the meta data defined for the iMPI process, and their associated transaction record number or probability. There is the ability to narrow down the search by specifying more than one search criteria in a search query.

Turning to FIG. 8, one embodiment of a Transaction Record is shown. The transaction record section displays the details of the selected transaction record along with the Master records and their associated calculated probabilities.

Analysis Overview

The Analysis section of the ADM Administration utility manages the data processing for iMPI. In this section, parameters are set based on statistics gathered from the data set, default data is excluded from processing, synonyms are created and managed by field, and iMPI processes are executed, and the resulting logs are monitored and reviewed.

The analysis section may have three tabs: Predicates (or Management), Execution Logs and Synonyms.

Predicates/Management: The predicate section enables a user to gather statistics from the data set, set up the probabilistic parameters, set run time execution parameters, and executes the scripts for the iMPI process.

Figure 9:
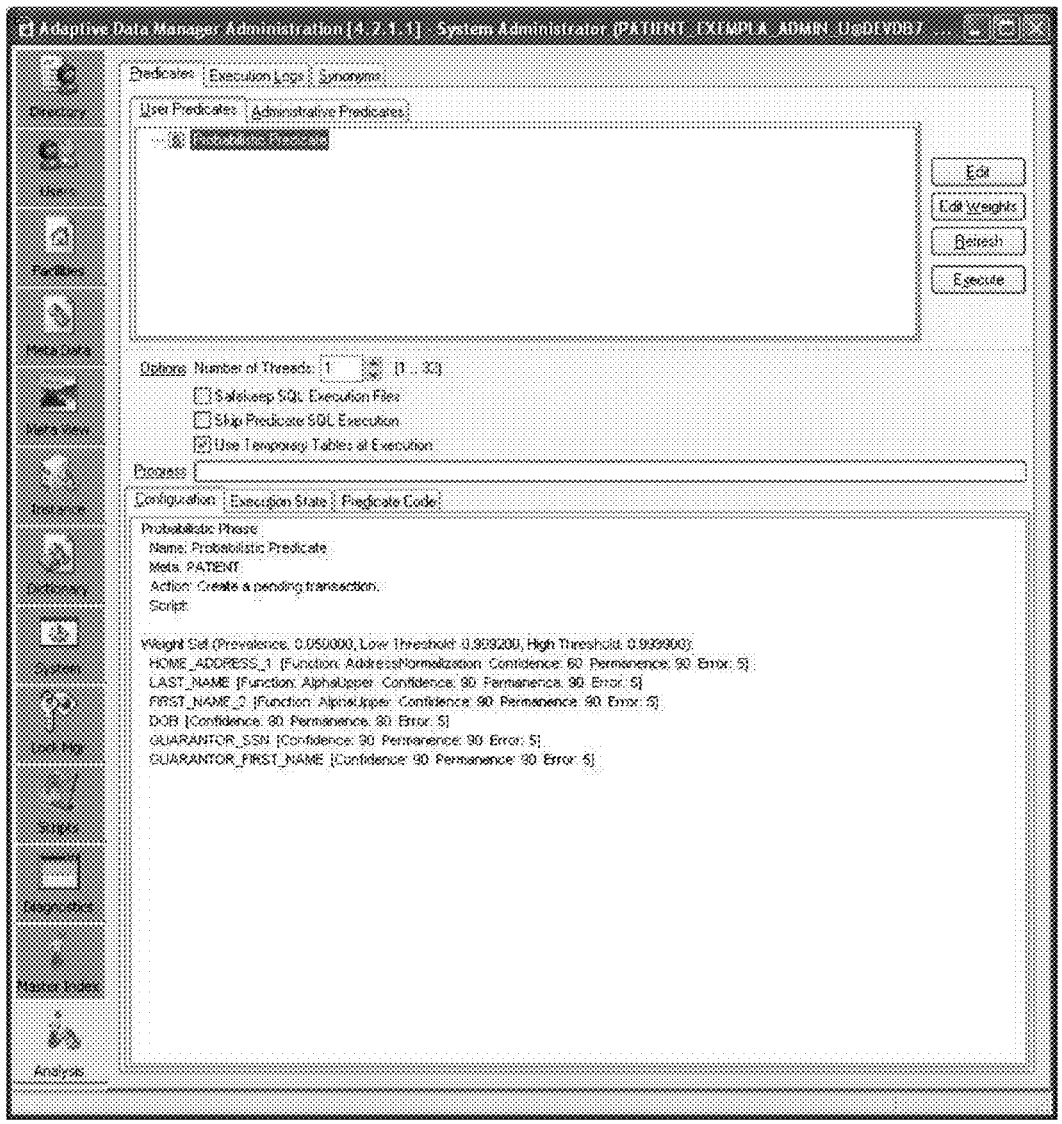
FIG. 9 is a screenshot of an exemplary iMPI predicate or management display.

FIG. 9 shows one version of a predicate or management display. This management section allows a user to view the objective values and to input and adjust the various subjective values that are required for the Hit Posterior Probabilistic calculations discussed above. A key feature of this display may include the ability to act as a calculator to allow the temporary modification of parameters and the interaction of how a matching or unmatching value will affect the probability calculation for a particular pattern.

Figure 10:
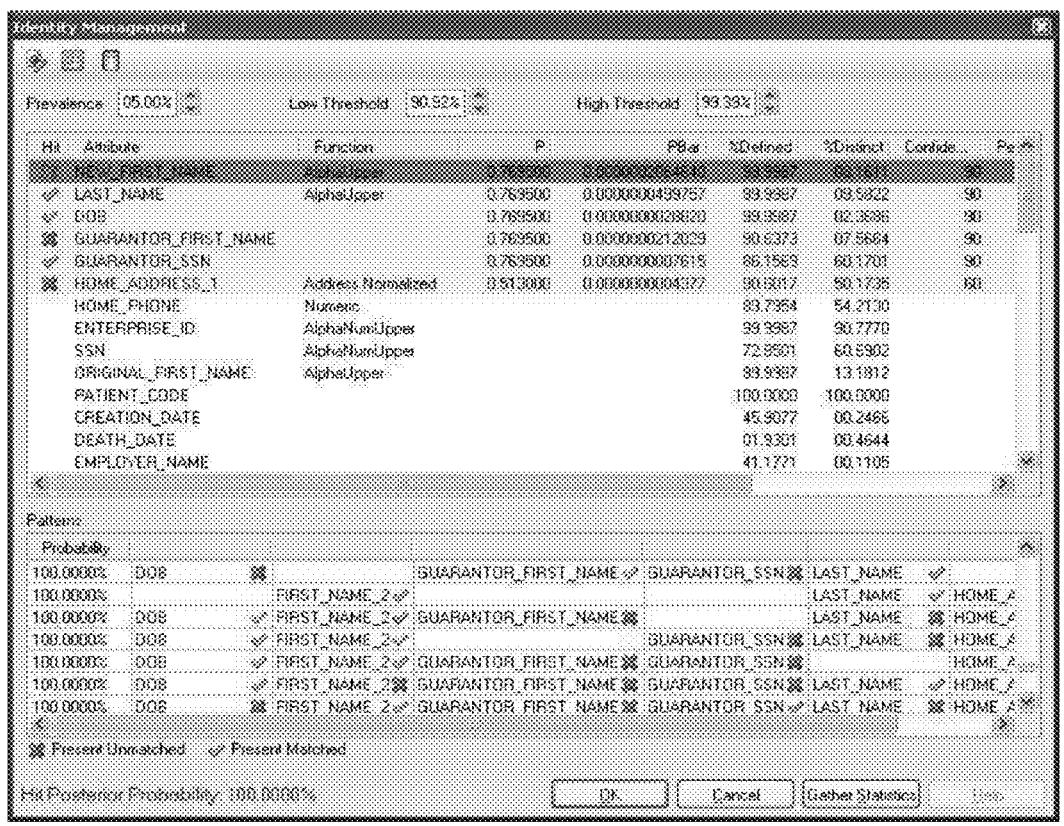
FIG. 10 is a screenshot of an exemplary iMPI pattern selection and management screen.

In addition, turning to FIG. 10, a user in this section may be able to select and manage the patterns for which a duplication analysis is to be run, including choosing the fields for which patterns are to be determined. Only those patterns whose probabilities lie above the 'Low Threshold' are used by the iMPI probabilistic process. In one example, the probability '0.998665' corresponds to the pattern that 'BUSINESS_MAILING_ADDR_1,' 'BUSINESS_PHONE,' 'FIRST_NAME,' 'LAST_NAME,' 'LICENSE,' 'NPI,' and 'UPIN' are each present and matched.

Most Relevant Attributes

In order to limit the quantity of calculations required to obtain a match for any given entity, the system may include a flagging process to indicate which attributes are to be considered the most relevant.

The first step in matching data may be to examine the client values for all attributes flagged as relevant. Only entities matching at least one of the most relevant attributes will be considered for further calculations. For speed of processing, it makes sense to avoid many database hits and much computation time on entities that match only slightly relevant data, especially if a large number of attributes exist in the weight set.

For example, consider attempting to match an entity with a person named Balthazar Oringopulos who lives in Chicago, Ill. The system may flag first and last name as top relevant attributes, citing vast diversity of values, and not city and state, especially if the client data is limited to the Chicago area. Thus, the system first may look only for entities with a first name attribute value of "Balthazar" and a last name attribute value of "Oringopulos," which would likely produce a very small set, instead of looking at everyone who lived in Chicago, Ill. Once the system has the set of all Balthazar Oringopuloses, it can then compare the rest of the client attributes to this small set in short order.

Figure 11:
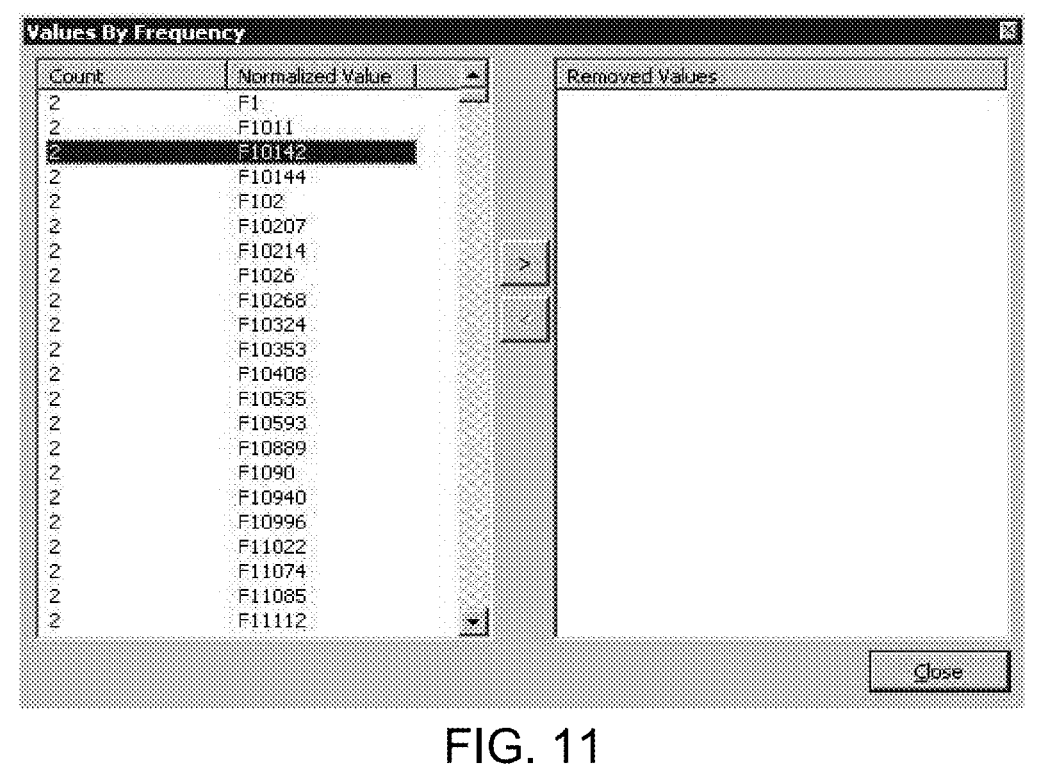

The system may include the ability to remove default data from probabilistic computations. Turning now to FIG. 11, one example of a display allowing a user to remove default values is shown.

The system may include the ability to re-compute the objective values gathered from the data set. For example, the frequency distribution of values for a particular field is an objective value that can be re-computed on demand by the system.

Figures 12, 13:
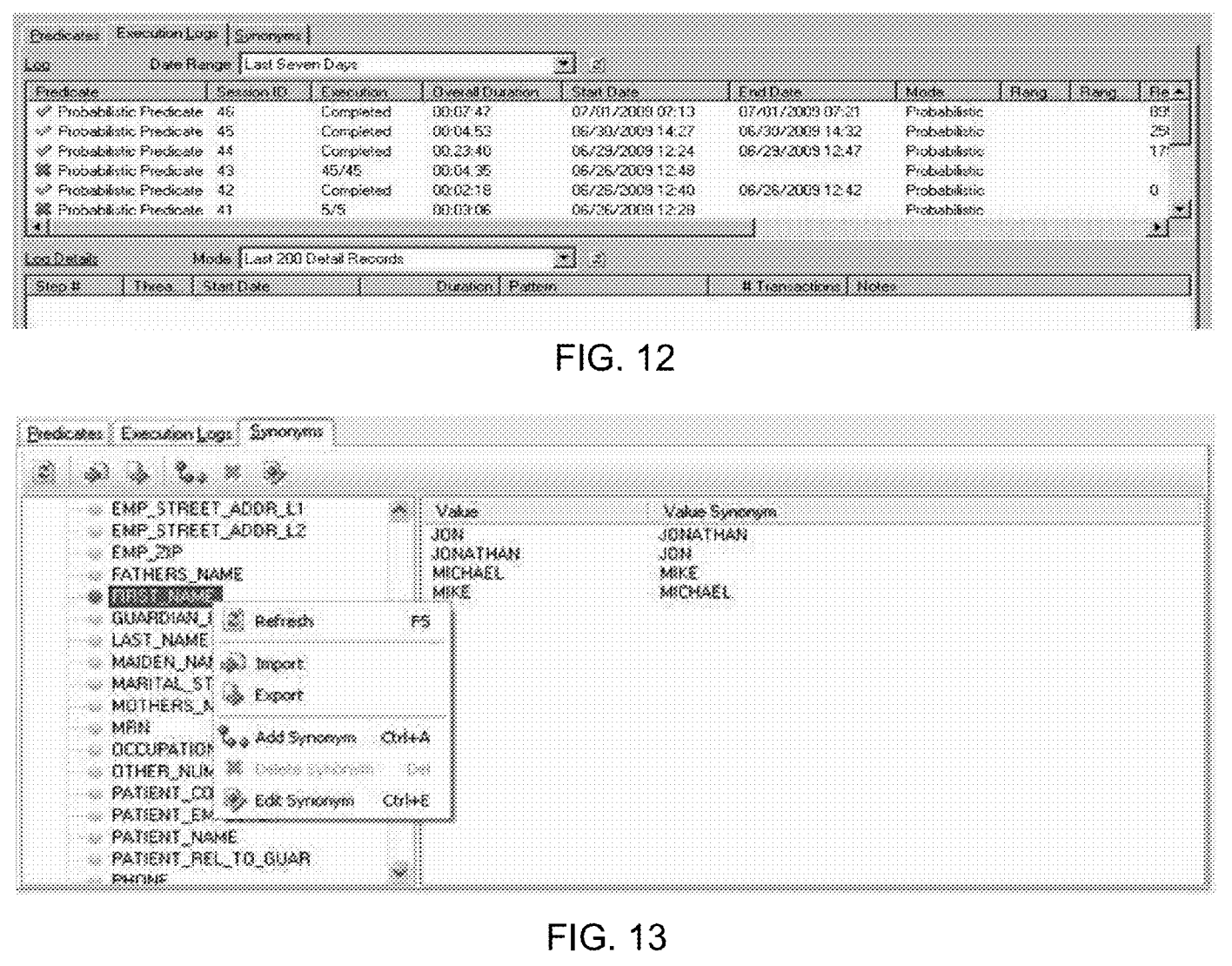

Execution Logs: As seen in FIG. 12, the Execution Log system may include an execution log display that shows a summary of all the analyses that are currently being processed or were processed in the past. The logs can be sorted, e.g., by the date they were performed by clicking on the Date Range dropdown.

Synonyms: Selecting a field on this tab displays the Synonyms associated with it. The system may include the ability to add, edit or remove associated synonyms by field. One example of this display may be seen in FIG. 13.

iMPI Workflow Process Example

The following discussion and related screenshots provide an example of a user interface through which the iMPI Workflow Process in ADM Administration Tool may be carried out.

Figure 14:
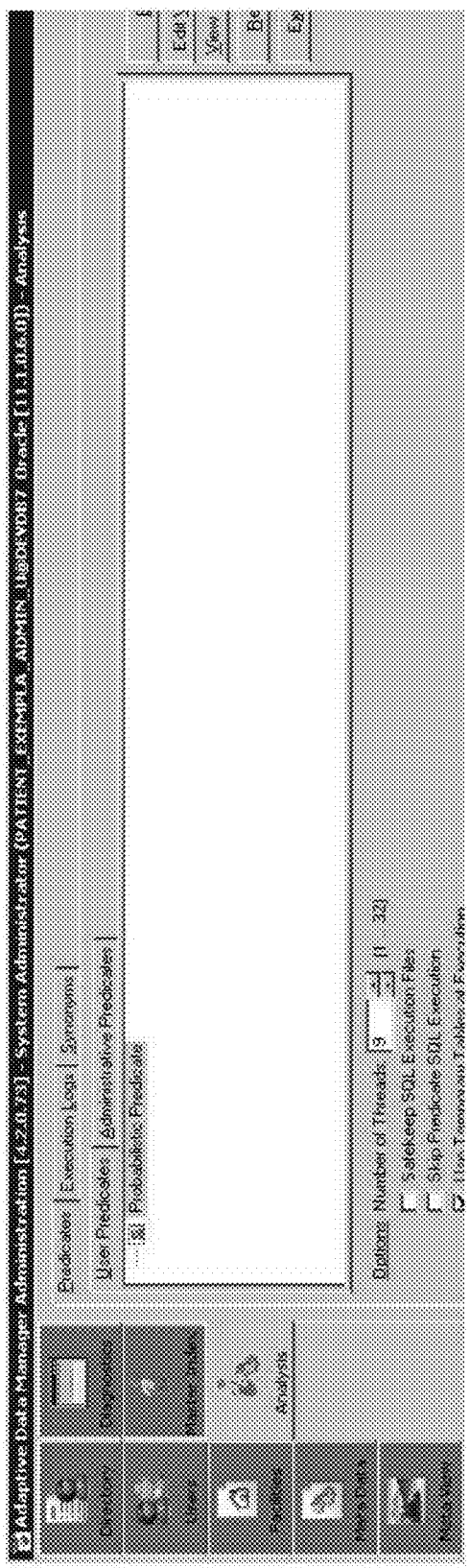
FIG. 14 is an exemplary screenshot for iMPI duplicate analysis.

To begin duplicate analysis in iMPI, first click on the 'Analysis' tab, as seen in FIG. 14. Next, select the 'Probabilistic Predicate' and click the 'Edit Weights' button to open the 'Identity Management' window.

Figure 15:
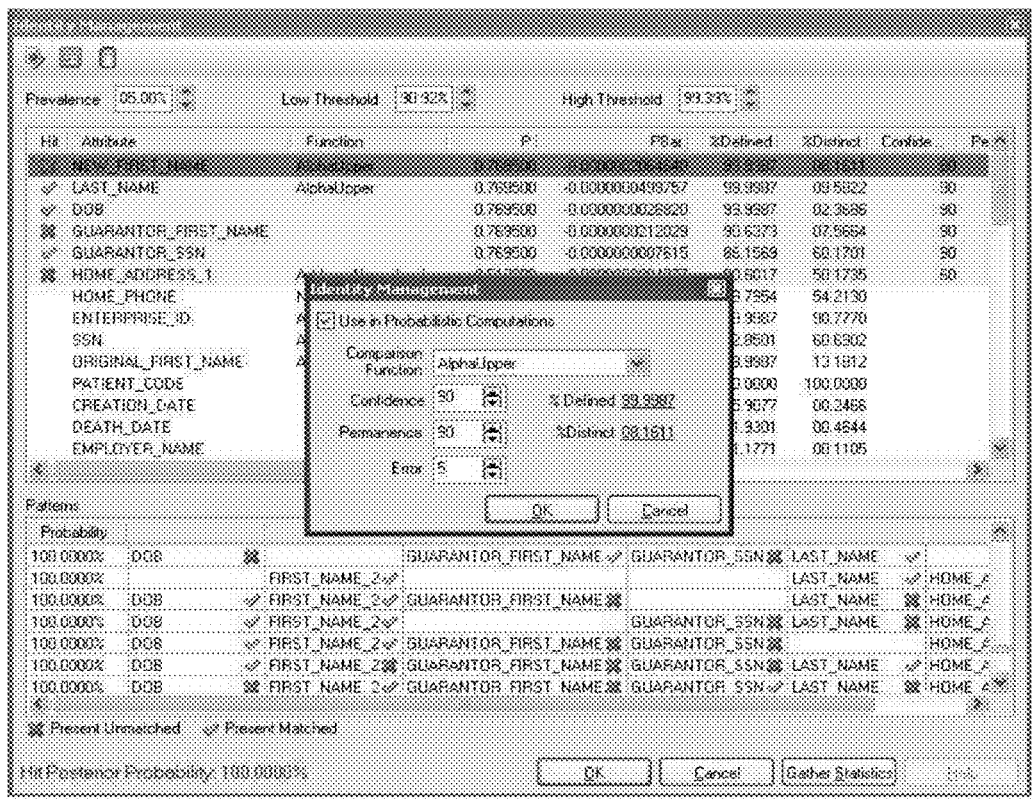
FIG. 15 is an exemplary screenshot displaying identity management options for iMPI duplicate analysis.

From there, attributes (metanodes) may be selected to be used in the probabilistic predicate. Turning to FIG. 15, in the 'Identity Management' window, at least one attribute must be declared as a probabilistic to initiate the probabilistic predicate. To do so, edit the desired node and check the box to indicate "Field is Probabilistic."

As seen in FIG. 15, prevalence and low thresholds may be set

The data set may necessitate cleaning before initiating the probabilistic predicate. This may be done in the 'Identity Management' window by viewing the top values for a given attribute. For instance, the Social Security Number 999-99-9999 is a default value in some patient databases. Values such as these can give rise to false duplicates and should be removed from comparison.

Executing the probabilistic predicate may comprise selecting the number of threads to be used and select any other desired options, and clicking the 'Execute' button.

Figure 16:
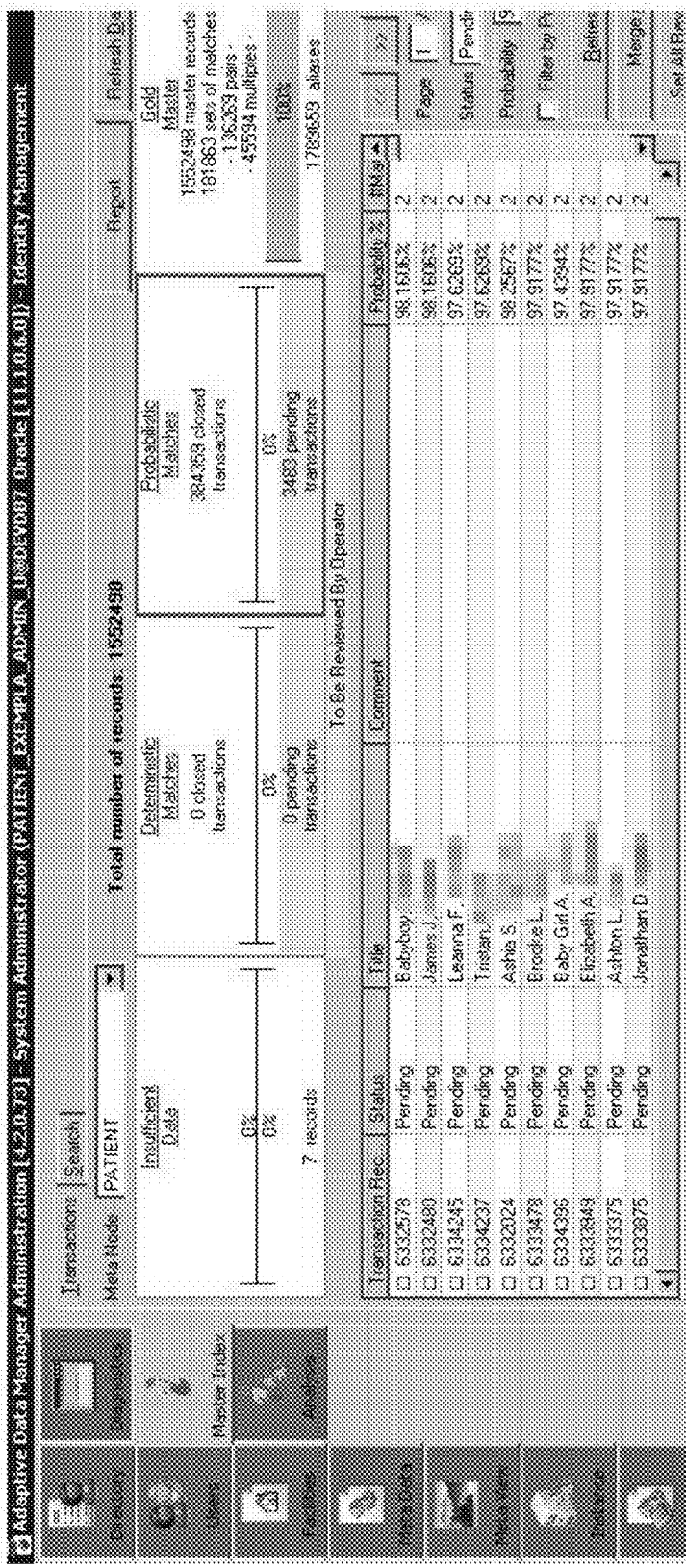
FIG. 16 is a screenshot displaying an exemplary transaction analysis following the probabilistic predicate execution.

Turning to FIG. 16, transaction analysis following the probabilistic predicate execution may be accomplished by selecting the 'Master Index' tab. Here, records may be individually checked or may be merged, set as reviewed, or closed along a given probability.

Re-running the Probabilistic Predicate: Due to iMPI's basis on master records, it may be fruitful to run the probabilistic predicate multiple times. Each time records are merged with one another, more information about the data set becomes available. When completing a second run, the user may adjust the parameters and may activate/deactivate fields for consideration. In addition, given any data set, there may be no objective criteria as to when it is no longer worthwhile to re-run the probabilistic predicate. Such a decision may be based upon the quality of the pending transactions that are created.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A process operable on one or more computers for estimating a posterior probability of a match between a plurality of records in a database, each record having a plurality of fields, comprising:
   calculating objective values relating to said fields;
   approximating subjective values relating to said fields;
   estimating an average number of duplicate records;
   estimating a total number of distinct duplicate records using said subjective values;
   determining a probability of a match between said records using said estimated average number of duplicate records and said estimated total number of distinct duplicate records;
   determining a probability of no match between said records;
   determining a conditional probability of a match between at least one of said fields of said records, given a match between said records, using said subjective values;
   determining a conditional probability of a match between at least one of said fields of said records, given no match between said records, using both said objective values and said subjective values; and
   using a Bayesian probability function to determine said posterior probability based on said probabilities and said conditional probabilities.

2. The process according to claim 1, wherein said objective values include:
   a percentage of defined values;
   a number of defined values;
   a number of defined values having frequencies greater than 2; and
   an average frequency.

3. The process according to claim 1, wherein said subjective values include:
   a prevalence of duplicates among said records;
   an error factor for said fields;
   a confidence factor for said fields;
   a permanence of said fields; and
   an estimated sample proportion for a confidence level.

4. The process according to claim 3, wherein said confidence level is about 99%.

5. The process according to claim 1, further comprising:
   selecting fields within said plurality of fields to compare for determining whether said records match.

6. The process according to claim 1, wherein said step of determining a probability of a match between said records comprises providing a value for a prevalence of duplicates.

7. The process according to claim 1, wherein said records are medical records.

8. A process operable on one or more computers for identifying duplicate records among a plurality of records in a database, each record having a plurality of fields, comprising:
(a) setting a threshold match probability;
(b) calculating record match probabilities for each of a plurality of possible patterns, wherein each pattern is a different permutation of comparisons between said fields and wherein each record match probability is a posterior probability that two records are duplicates given that the two records fit the respective pattern;
(c) identifying patterns having record match probabilities meeting or exceeding said threshold match probability;
(d) disregarding patterns having record match probabilities lower than said threshold match probability;
(e) determining which records pairs within the plurality of records have one or more of said identified patterns; and
(f) analyzing said record pairs to determine whether said record pairs are duplicates; wherein steps (b)-(d) occur prior to steps (e) and (f).

9. The process according to claim 8, wherein said threshold match probability and said record match probabilities are Bayesian posterior probabilities.

10. The process according to claim 8, wherein results of said comparisons between said fields are: match, no match, and absent.

11. The process according to claim 8, wherein said analyzed record pairs are categorized as duplicates, not duplicates, or indeterminate.

12. The process according to claim 8, wherein for each set of records having more than one pattern with a match probability greater than said threshold match probability, considering only the pattern with the highest match probability.

13. A process operable on one or more computers for identifying duplicate records among a plurality of records in a database, each record having a plurality of fields, comprising:
(a) setting a threshold match probability;
(b) selecting one or more of said fields for comparison;
(c) calculating record match probabilities for each of a plurality of possible patterns, wherein each pattern is a different permutation of comparisons between said fields and wherein each record match probability is a posterior probability that two records match given that the two records fit the respective pattern;
(d) identifying patterns having record match probabilities higher than said threshold match probability;
(e) disregarding patterns having record match probabilities lower than said threshold match probability;
(f) determining which record pairs within the plurality of records have one or more of said identified patterns; and
(g) analyzing said record pairs to determine whether said records are duplicates; and
(h) merging duplicate records,
wherein said threshold match probability and said record match probabilities are Bayesian posterior probabilities; and
wherein steps (c)-(e) occur prior to steps (f)-(h).

14. The process according to claim 13, wherein said step of calculating record match probabilities comprises:
calculating objective values relating to said fields;
approximating subjective values relating to said fields;
estimating an average number of duplicate records;
estimating a total number of distinct duplicate records using said subjective values;
determining a probability of a match between said records using said estimated average number of duplicate records and said estimated total number of distinct duplicate records;
determining a probability of no match between said records;
determining a conditional probability of a match between at least one of said fields of said records, given a match between said records, using said subjective values; and
determining a conditional probability of a match between at least one of said fields of said records, given no match between said records, using both said objective values and said subjective values.

15. The process according to claim 14, wherein said objective values include one or more of:
a percentage of defined values;
a number of defined values;
a number of defined values having frequencies greater than 2; and
an average frequency;
and further wherein said subjective values include one or more of:
a prevalence of duplicates among said records;
an error factor for said fields;
a confidence factor for said fields;
a permanence of said fields; and
an estimated sample proportion for a confidence level.

16. The process according to claim 13, further comprising:
normalizing values in said selected fields prior to said analyzing step; and
removing default data in said selected fields prior to said analyzing step.

17. The process according to claim 13, wherein said analyzing step comprises parallel computations within one of, or a plurality of, said one or more computers.

18. The process according to claim 13, wherein said analyzing step comprises sorting said record pairs into high probability, low probability, and indeterminate matches.

19. The process according to claim 13, further comprising:
selecting one or more different fields for comparison;
calculating second possible patterns, wherein each pattern is a different permutation of comparisons between said different fields;
calculating second record match probabilities for each of said second possible patterns;
identifying second patterns having record match probabilities higher than said threshold match probability; and
analyzing record pairs corresponding to said identified second patterns to determine whether said record pairs are duplicates.

20. The process according to claim 13, comprising a database, a middle tier, and a user interface for carrying out said process.

21. The process according to claim 13, further comprising:
processing intelligent agents.

22. The process according to claim 13, wherein said analyzing step comprises:
determining which of said fields and which of said patterns yield significant results for future selecting and analyzing steps applied to said plurality of records or to a different plurality of records.

* * * * *